US010432492B2

(12) United States Patent
Iwakura et al.

(10) Patent No.: US 10,432,492 B2
(45) Date of Patent: Oct. 1, 2019

(54) METHOD AND APPARATUS FOR ANALYZING COMMUNICATION QUALITY, AND NON-TRANSITORY COMPUTER-READABLE STORAGE MEDIUM

(71) Applicant: FUJITSU LIMITED, Kawasaki-shi, Kanagawa (JP)

(72) Inventors: Hirokazu Iwakura, Adachi (JP); Yuji Nomura, Kawasaki (JP); Fumiyuki Iizuka, Kawasaki (JP); Sumiyo Okada, Kawasaki (JP); Naoyoshi Ohkawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 304 days.

(21) Appl. No.: 15/420,709

(22) Filed: Jan. 31, 2017

(65) Prior Publication Data
US 2017/0289003 A1 Oct. 5, 2017

(30) Foreign Application Priority Data

Mar. 29, 2016 (JP) ................... 2016-066755

(51) Int. Cl.
*G06F 15/173* (2006.01)
*H04L 12/26* (2006.01)
(Continued)

(52) U.S. Cl.
CPC ...... *H04L 43/0876* (2013.01); *H04L 12/4641* (2013.01); *H04L 43/12* (2013.01);
(Continued)

(58) Field of Classification Search
CPC ............. H04L 12/4641; H04L 43/0864; H04L 43/0876; H04L 43/12; H04L 49/90; H04L 67/1095
(Continued)

(56) References Cited

U.S. PATENT DOCUMENTS 7,606,154 B1 * 10/2009 Lee ..................... H04J 3/14
370/232
7,764,689 B2 * 7/2010 Bernick ............... H04L 47/56
370/392

(Continued)

FOREIGN PATENT DOCUMENTS

JP 11-266270 9/1999
JP 2002-252629 9/2002
JP 2015-197715 11/2015

*Primary Examiner* — Liang Che A Wang
(74) *Attorney, Agent, or Firm* — Staas & Halsey LLP

(57) ABSTRACT

A method for analyzing communication qualities between virtual machines serving as transmission sources and virtual machines serving as transmission destinations on a virtual network includes identifying, by a computer, based on the temporal sequence of the input queue information and the temporal sequence of the output queue information, a first pair and a second pair as mirroring targets, wherein the input queue information indicates a first queue length indicating a number of pieces of data addressed from one of the transmission sources to one of the transmission destinations, wherein the output queue information indicates a second queue length indicating a number of pieces of data included in an output queue of the one of the transmission destinations.

12 Claims, 33 Drawing Sheets

(51) Int. Cl.
  *H04L 12/46* (2006.01)
  *H04L 29/08* (2006.01)
  *H04L 12/861* (2013.01)

(52) U.S. Cl.
  CPC .......... *H04L 49/90* (2013.01); *H04L 67/1095* (2013.01); *H04L 43/0864* (2013.01)

(58) Field of Classification Search
  USPC ................................ 709/201, 223, 224, 225
  See application file for complete search history.

(56) References Cited

U.S. PATENT DOCUMENTS

| | | | | |
|---|---|---|---|---|
| 8,046,769 B2* | 10/2011 | Masuda | .............. | G06F 11/3409 702/182 |
| 2002/0154649 A1* | 10/2002 | Takase | ................ | H04L 49/3045 370/412 |
| 2015/0277959 A1* | 10/2015 | Higuchi | .............. | G06F 9/45558 718/1 |

* cited by examiner

FIG. 14

| PERIODIC TIME (msec) | TRANSMISSION SOURCE VM1 | | | TRANSMISSION SOURCE VM2 | | | TRANSMISSION SOURCE VM3 | | | ... | TRANSMISSION SOURCE VMn | | |
|---|---|---|---|---|---|---|---|---|---|---|---|---|---|
| | q14 | q15 | q16 | q24 | q25 | q26 | q34 | q35 | q36 | ... | qn4 | qn5 | qn6 |
| 0 | 10 | 5 | 150 | 10 | 0 | 10 | 10 | 5 | 10 | ... | 0 | 0 | 0 |
| 100 | 0 | 0 | 150 | 0 | 20 | 0 | 50 | 0 | 0 | ... | 100 | 100 | 100 |
| 200 | 10 | 5 | 150 | 10 | 40 | 10 | 150 | 5 | 10 | ... | 200 | 200 | 200 |
| ... | ... | ... | ... | ... | ... | ... | ... | ... | ... | ... | ... | ... | ... |
| 1000 | 0 | 0 | 150 | 0 | 200 | 0 | 150 | 0 | 0 | ... | 1000 | 1000 | 1000 |

| PERIODIC TIME (msec) | TRANSMISSION DESTINATION VM4 | TRANSMISSION DESTINATION VM5 | ... | TRANSMISSION DESTINATION VM6 | ... | TRANSMISSION DESTINATION VMm |
|---|---|---|---|---|---|---|
| | q4 | q5 | ... | q6 | ... | qm5 |
| 0 | 10 | 0 | ... | 150 | ... | 0 |
| 100 | 0 | 20 | ... | 150 | ... | 100 |
| 200 | 10 | 40 | ... | 150 | ... | 200 |
| ... | ... | ... | ... | ... | ... | ... |
| 1000 | 0 | 200 | ... | 150 | ... | 1000 |

| TRANSMISSION SOURCE VM1 | | | TRANSMISSION SOURCE VM2 | | |
|---|---|---|---|---|---|
| TRANSMISSION DESTINATION VM4 | TRANSMISSION DESTINATION VM5 | TRANSMISSION DESTINATION VM6 | TRANSMISSION DESTINATION VM4 | TRANSMISSION DESTINATION VM5 | TRANSMISSION DESTINATION VM6 |
| 0 | 0 | 0 | 0 | 0 | 0 |

| TRANSMISSION SOURCE VM3 | | | TRANSMISSION SOURCE VMn | | |
|---|---|---|---|---|---|
| TRANSMISSION DESTINATION VM4 | TRANSMISSION DESTINATION VM5 | TRANSMISSION DESTINATION VM6 | TRANSMISSION DESTINATION VM4 | TRANSMISSION DESTINATION VM5 | TRANSMISSION DESTINATION VM6 |
| 0 | 0 | 0 | 0 | 0 | 0 |

56

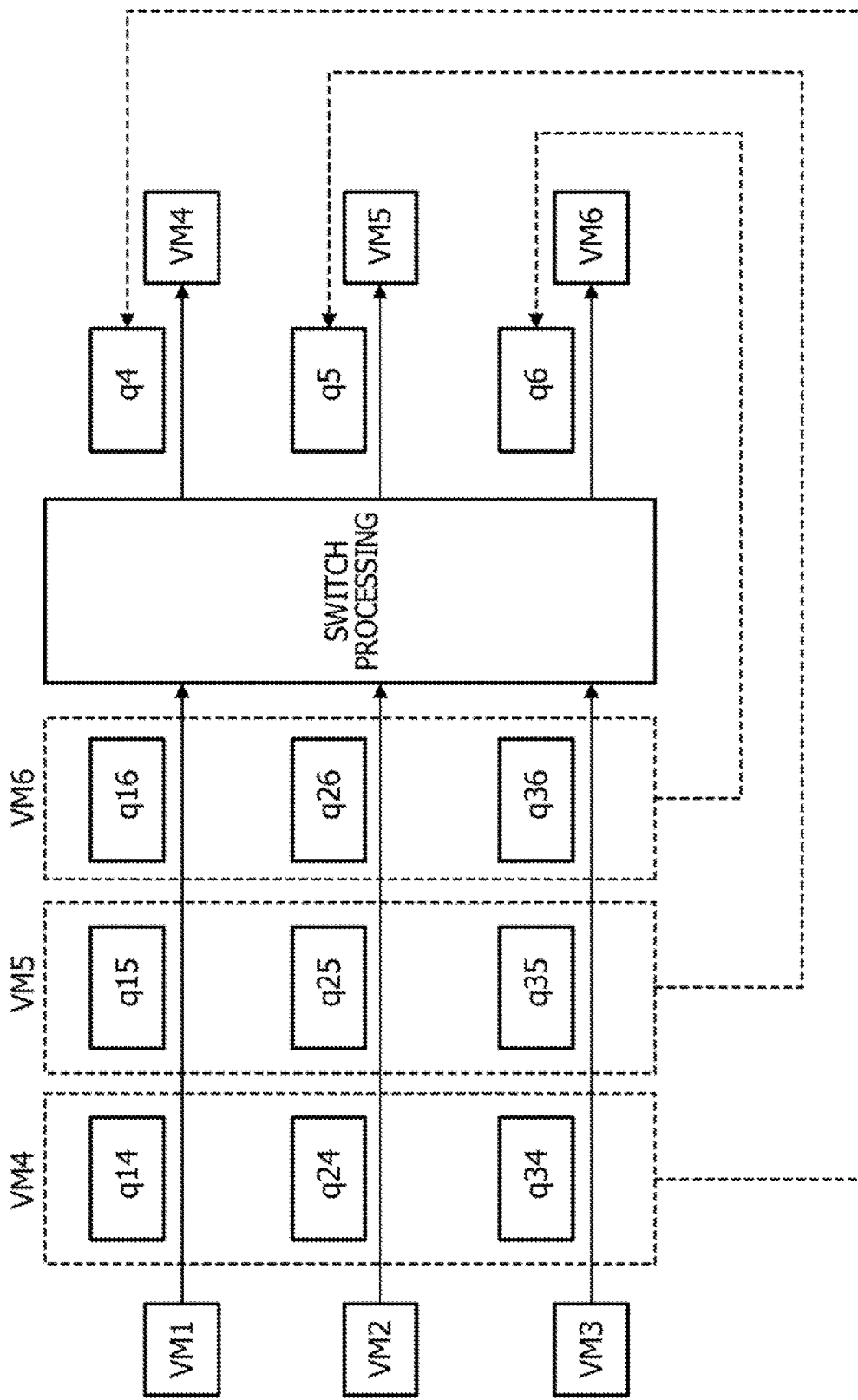

METHOD AND APPARATUS FOR ANALYZING COMMUNICATION QUALITY, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-066755, filed on Mar. 29, 2016, the entire contents of which are incorporated herein by reference.

FIELD

The embodiments discussed herein are related to a method, an apparatus for analyzing communication quality, and a recording medium.

BACKGROUND

In the past, there has been known a capture point determination method for calculating a usage amount, caused by mirroring, of a processor in a virtual switch, based on usage amounts of the processor in the virtual switch at a time of performing no mirroring and at a time of performing mirroring and the number of packets routed through a port serving as a mirroring target.

In addition, there is known a packet processing apparatus that obtains, based on information related to a queue length of a queue buffer, priority information related to acquisition of a right to deliver a packet, in accordance with a preliminarily defined mathematical expression.

In addition, there is known a technology in which cell buffer threshold values TA and TB (TA>TB) are set and in a case where a queue length of a cell buffer exceeds the threshold value TB, it is determined whether or not a new arrival cell is a cell to be output to an output line in a congestion state.

As examples of the related art, Japanese Laid-open Patent Publication No. 2015-197715, Japanese Laid-open Patent Publication No. 2002-252629, and Japanese Laid-open Patent Publication No. 11-266270 are known.

SUMMARY

According to an aspect of the invention, a method for analyzing communication qualities between virtual machines serving as transmission sources and virtual machines serving as transmission destinations on a virtual network includes [1] reading, by a computer, a temporal sequence of input queue information and a temporal sequence of output queue information from a storage unit in which the input queue information and the output queue information are stored in a temporal sequence, wherein the input queue information indicates, for each of the transmission sources, a first queue length indicating a number of pieces of data addressed from one of the transmission sources to one of the transmission destinations, the pieces of data being included in an input queue of the one of the transmission source, and the output queue information indicates, for each of the transmission destinations, a second queue length indicating a number of pieces of data included in an output queue of the one of the transmission destinations; and [2] identifying, by the computer, based on the temporal sequence of the input queue information and the temporal sequence of the output queue information, a first pair and a second pair as mirroring targets, wherein the first pair is a pair of a first source among the transmission sources and a first destination among the transmission destinations, in which the first queue length of data addressed to the first destination, indicated by the input queue information of the first source, is greater than or equal to a first threshold value, a value of a correlation between a temporal transition of the first queue length of data addressed to the first destination, the first queue length being indicated by the input queue information, and a temporal transition of the second queue length indicated by the output queue information of the first destination is greater than a second threshold value, and an increase rate of the first queue length of data addressed to the first destination, the first queue length being indicated by the input queue information, is less than or equal to a third threshold value, and wherein the second pair is a pair of a second source among the transmission sources and a second destination among the transmission destinations, in which the first queue length of data addressed to the second destination, indicated by the input queue information of the second source, is greater than or equal to the first threshold value, and a value of a correlation between a temporal transition of the first queue length of data addressed to the second destination, the first queue length being indicated by the input queue information, and a temporal transition of the second queue length of the output queue information of the second destination is less than or equal to the second threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram illustrating an example of an input queue table;

FIG. 15 is a diagram illustrating an example of an output queue table;

FIG. 16 is a diagram illustrating an example of a mirroring setting table;

FIG. 17 is an explanatory diagram for explaining measurement of a queue length of an input queue;

DESCRIPTION OF EMBODIMENTS

In the related art, simply based on information of both the usage amount of a processor and the number of packets or information of a queue length, a setting of mirroring is performed. Therefore, even in a case where a communication speed between virtual machines is not low in speed, the setting of mirroring turns out to be performed.

As one aspect of the present embodiment, provided are solutions for being able to identify, as a mirroring target, a pair of a virtual machine serving as a transmission source and a virtual machine serving as a transmission destination in which a communication speed between the virtual machines is low in speed.

Hereinafter, an example of the disclosed technology will be described in detail with reference to drawings.

Regarding Setting of Mirroring in Virtual System

First, before describing details of individual embodiments, outlines of a virtual system and the present embodiment will be described.

Outline of Virtual System

Figure 1:
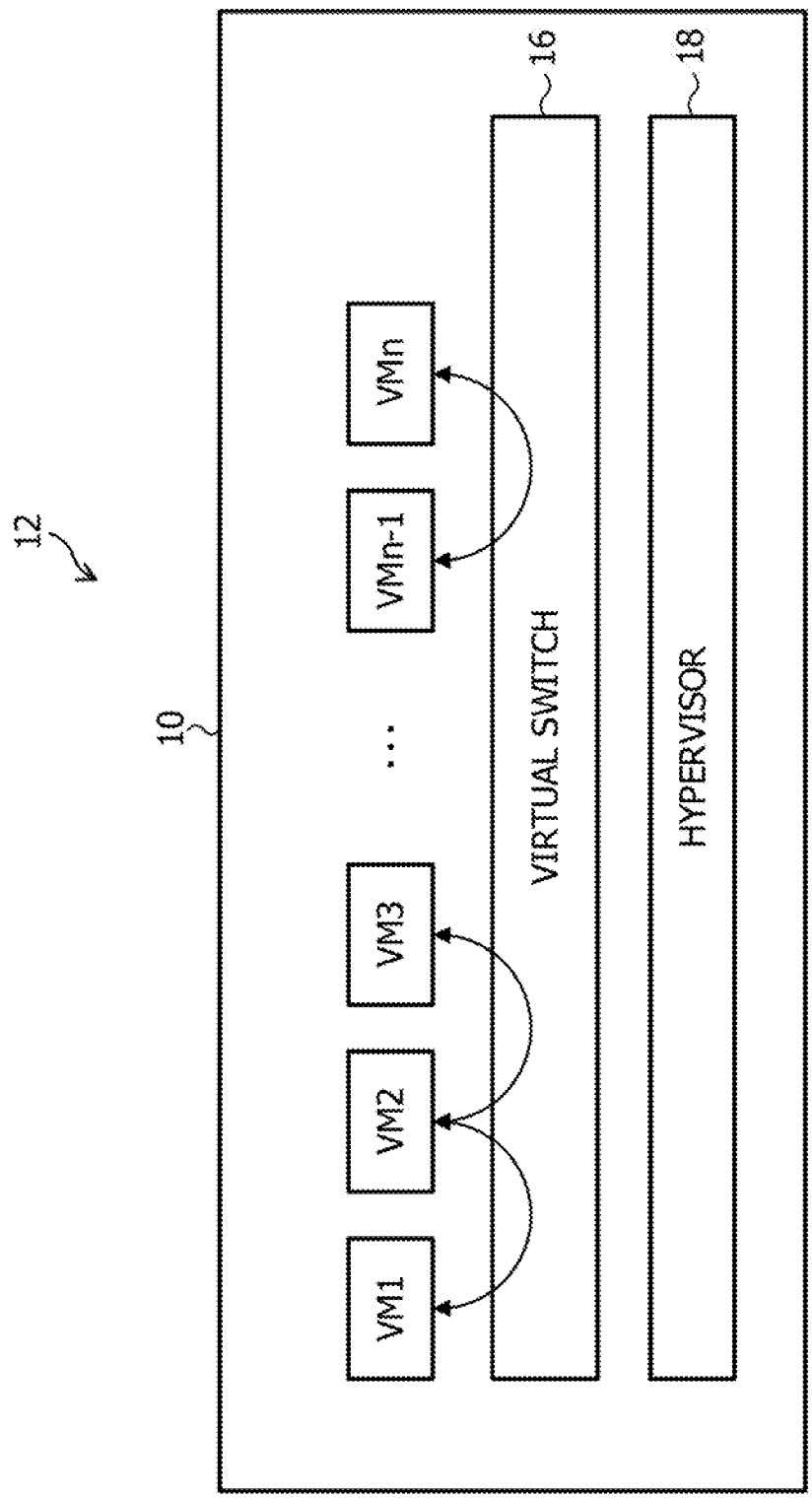
FIG. 1 is a block diagram illustrating an example of a virtual system.

FIG. 1 illustrates a diagram for explaining a virtual system. As illustrated in FIG. 1, a virtual system 10 is a system that virtualizes a central processing unit (CPU), a memory, and so forth serving as pieces of hardware of a physical computer 12 and that causes virtual machines VM1 to VMn (represented as "virtual machines" in a case where the virtual machines are not discriminated and are collectively called) to function.

Here, the physical computer 12 includes the CPU, the memory, a hard disk, and so forth (the illustration thereof is omitted). In addition, software of the physical computer 12 functions so as to include the virtual machine VM1 to VMn, a virtual switch 16, and a hypervisor 18. As illustrated in FIG. 1, communication between the virtual machines is performed via the virtual switch 16. In addition, the hypervisor 18 performs control and monitoring of operations of the virtual machines VM1 to VMn (acquisition of, for example, CPU usage rates and memory usage rates).

Figure 2:
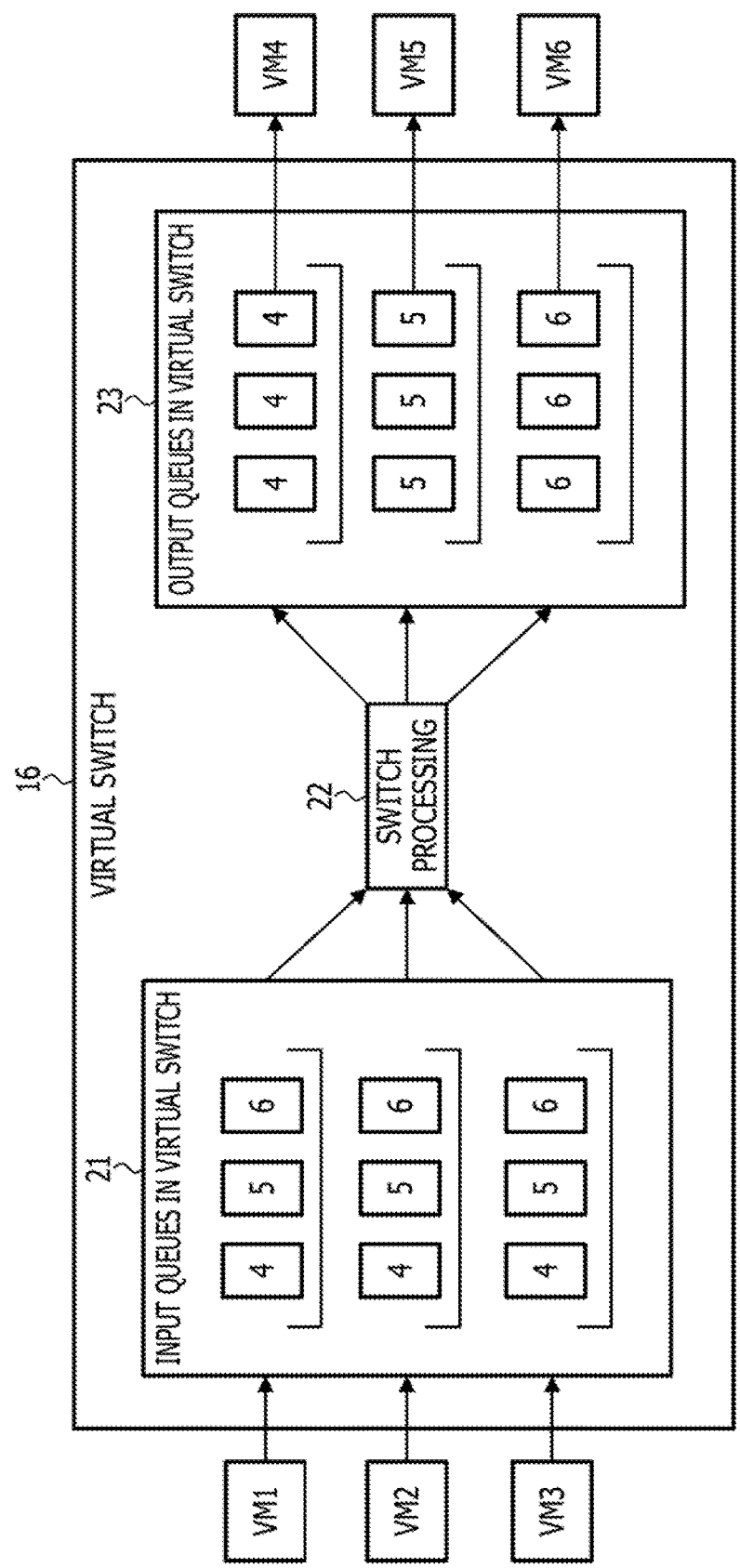
FIG. 2 is an explanatory diagram for explaining communication between virtual machines in the virtual system.

FIG. 2 illustrates an explanatory diagram for explaining communication between the virtual machines. As illustrated in FIG. 2, communication between the virtual machines VM1 to VM3 serving as respective transmission sources and the virtual machines VM4 to VM6 serving as respective transmission destinations is performed via the virtual switch 16. In addition, in the communication between the virtual machines VM1 to VM3 serving as respective transmission sources and the virtual machines VM4 to VM6 serving as respective transmission destinations, packet communication utilizing a transmission control protocol (TCP) is performed.

In the packet communication between the virtual machines, the virtual machines serving as respective transmission sources each secure a buffer on the memory and each connect a packet to a corresponding one of input queues 21 in the virtual switch 16 as illustrated in FIG. 2. In addition, in switch processing 22 in the virtual switch 16, based on transmission destination addresses of packets, packets to be transferred to the virtual machines serving as respective transmission destinations are connected to output queues 23 in the virtual switch 16. In a case where there is a packet in the corresponding one of the output queues 23 in the virtual switch 16, the relevant output queue 23 being addressed to one of the virtual machines serving as transmission destinations, the corresponding one of the virtual machines receives the relevant packet. Note that, as illustrated in the above-mentioned FIG. 2, numbers put in squares included in the input queues 21 or the output queues 23 each indicate one packet and the numbers indicate the respective virtual machines serving as transmission destinations.

Regarding Reduction in Network Quality

In packet communication between physical servers, the speed of a physical communication path (for example, the speed of the Ethernet (registered trademark) or the speed of a switch) is an upper limit of a communication speed. In a case where the physical servers are coupled to each other by the Ethernet of, for example, 1 Gbps, the communication speed is less than 1 Gbps.

However, in a case of communication between virtual machines in a virtual system, since there is no physical communication path and an upper limit of a communication speed is close to a processing speed at which a memory is handled (for example, the speed of memory copying or the rate of a memory access), high-speed communication (for example, 20 Gbps) is performed.

If the communication speed between the virtual machines increases in speed, in a case of analyzing and monitoring all packets between the virtual machines in a network, the number of packets to be analyzed per unit time increases, and processing for analyzing and monitoring turns out to be delayed. Therefore, it is difficult to analyze and monitor all the packets between the virtual machines.

Accordingly, in the virtual system, it is difficult to capture, analyze, and monitor all the packets between the virtual machines. Therefore, it is desirable to effectively analyze and monitor communication packets between virtual machines between which a communication speed is decreased and between which a network quality is reduced.

Figure 3:
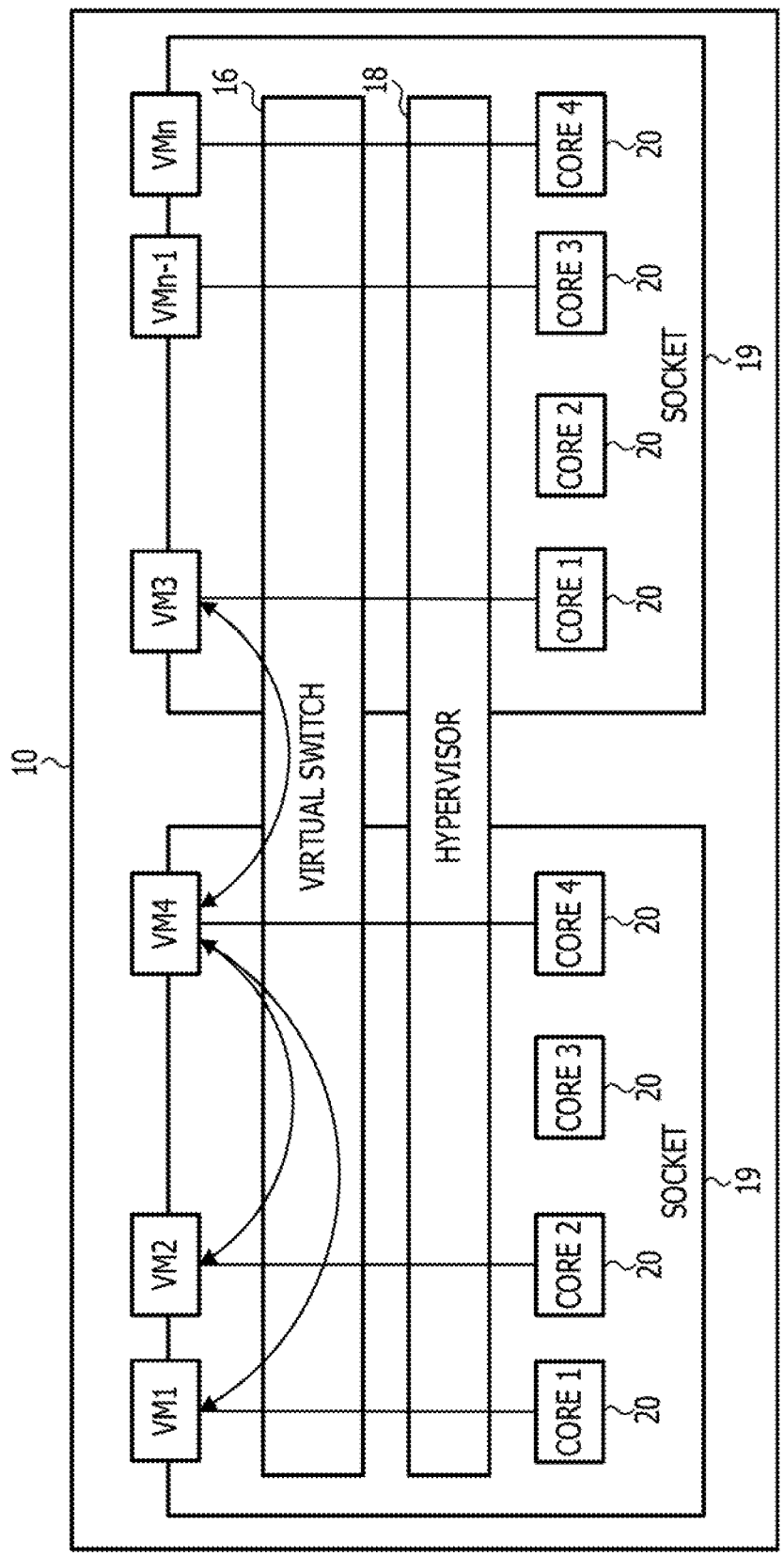
FIG. 3 is an explanatory diagram for explaining communication between virtual machines in the virtual system.

FIG. 3 illustrates an example of a case where, in the virtual system 10, a communication speed between virtual machines decreases in speed and a network quality therebetween is reduced. In FIG. 3, a virtual system that operates on a multi-CPU core physical server will be described as an example. In the virtual system illustrated in FIG. 3, sockets 19 each include 4 CPU cores 20. In addition, the CPU cores 20 are allocated to respective virtual machines.

As illustrated in the above-mentioned FIG. 3, in the virtual system 10 that operates on the multi-CPU core physical server, a scheduler in the hypervisor 18 allocates the CPU cores 20 to the respective virtual machines. In addition, the CPU cores 20 cause the respective virtual machines to operate. The scheduler only evenly allocates the CPU cores 20 to the virtual machines and does not identify the CPU cores 20 to cause the virtual machines to operate.

In communication between the CPU cores 20 illustrated in the above-mentioned FIG. 3, a communication speed between the CPU cores 20 in the same socket 19 and a communication speed between the CPU cores 20 between the different sockets 19 are different from each other. Specifically, a communication speed between the CPU cores 20 to straddle the sockets 19 is slower than a communication speed between the CPU cores 20 within the same socket 19. The reason is that since communication between the CPU cores 20 corresponds to a memory access rate, a memory access rate to straddle the sockets 19 becomes slow in a case where a memory access rate within one of the sockets 19 is compared with the memory access rate to straddle the sockets 19. From this, depending on the sockets 19 to which the virtual machines are allocated and a communication path, a phenomenon in which a communication speed between the virtual machines decreases in speed and a network quality is reduced occurs.

Regarding, for example, communication between virtual machines VM, performed with the virtual machine VM4 illustrated in FIG. 3, while high-speed communication is established in each of the virtual machine VM1→the virtual machine VM4 and the virtual machine VM2→the virtual machine VM4, low-speed communication is established in the virtual machine VM3→the virtual machine VM4.

In order to effectively analyze and monitor communication between the virtual machines between which a communication speed is low in speed, it is desirable to measure the communication speed. In order to obtain a communication speed in the virtual system 10, it is desirable to obtain a packet length read in a unit time. However, since read packets do not exist in a queue, it is difficult to obtain a read rate, and it is difficult to measure the communication speed.

Figure 4:
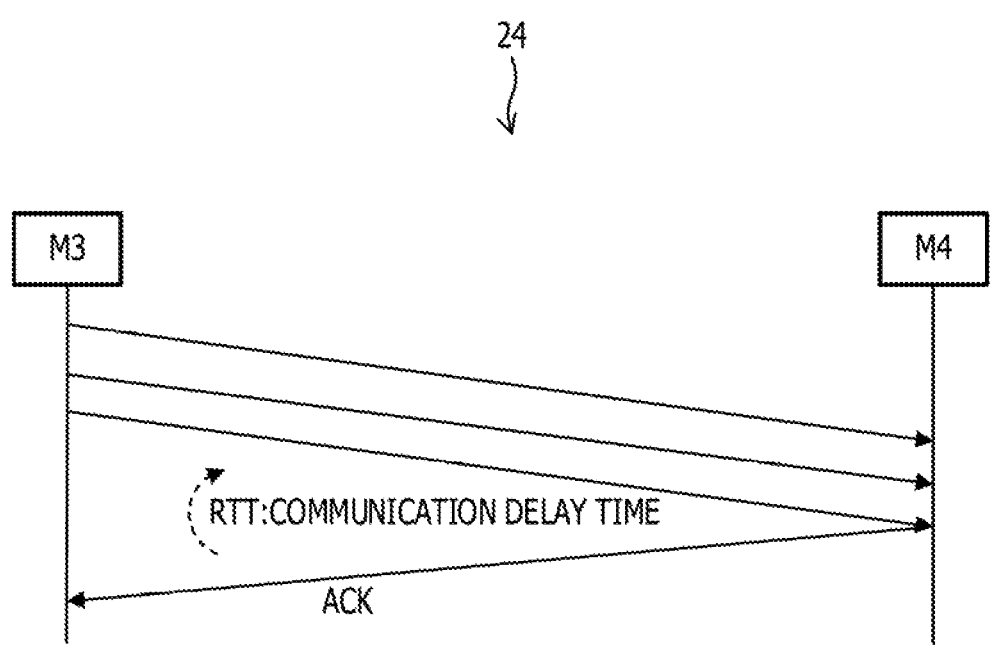
FIG. 4 is an explanatory diagram for explaining communication between physical servers.

In a case of analyzing the network quality of communication between, for example, a physical server M3 and a physical server M4 as illustrated in FIG. 4, usually a TCP header of a packet flowing between the physical servers M3 and M4 is analyzed by using a mirroring function of a switch. In addition, a time difference in transmission time between a data transfer packet of a TCP protocol and an acknowledgement signal packet (Acknowledgement (ACK)) of the relevant data transfer packet is calculated, thereby measuring a communication round-trip delay time (Round-Trip delay Time (RTT)) of the TCP.

As illustrated in FIG. 4, in packet communication 24 between the physical servers M3 and M4, if congestion indicating a read delay occurs in the physical server M4 serving as a transmission destination, read processing of a packet is delayed by an application of the physical server M4. In this case, since a packet arrives at a kernel of the physical server M4 and the kernel sends back the ACK, the RTT does not become large (does not become greater than, for example, an average value). As a result, by using the value of the RTT, it is possible to discriminate a communication delay and the congestion of a server from each other. Therefore, in a case of analyzing a network quality between the physical servers, if a physical server for which the RTT increases is subjected to mirroring, it is possible to analyze and monitor only a communication packet, the communication speed of which decreases.

Figure 5:
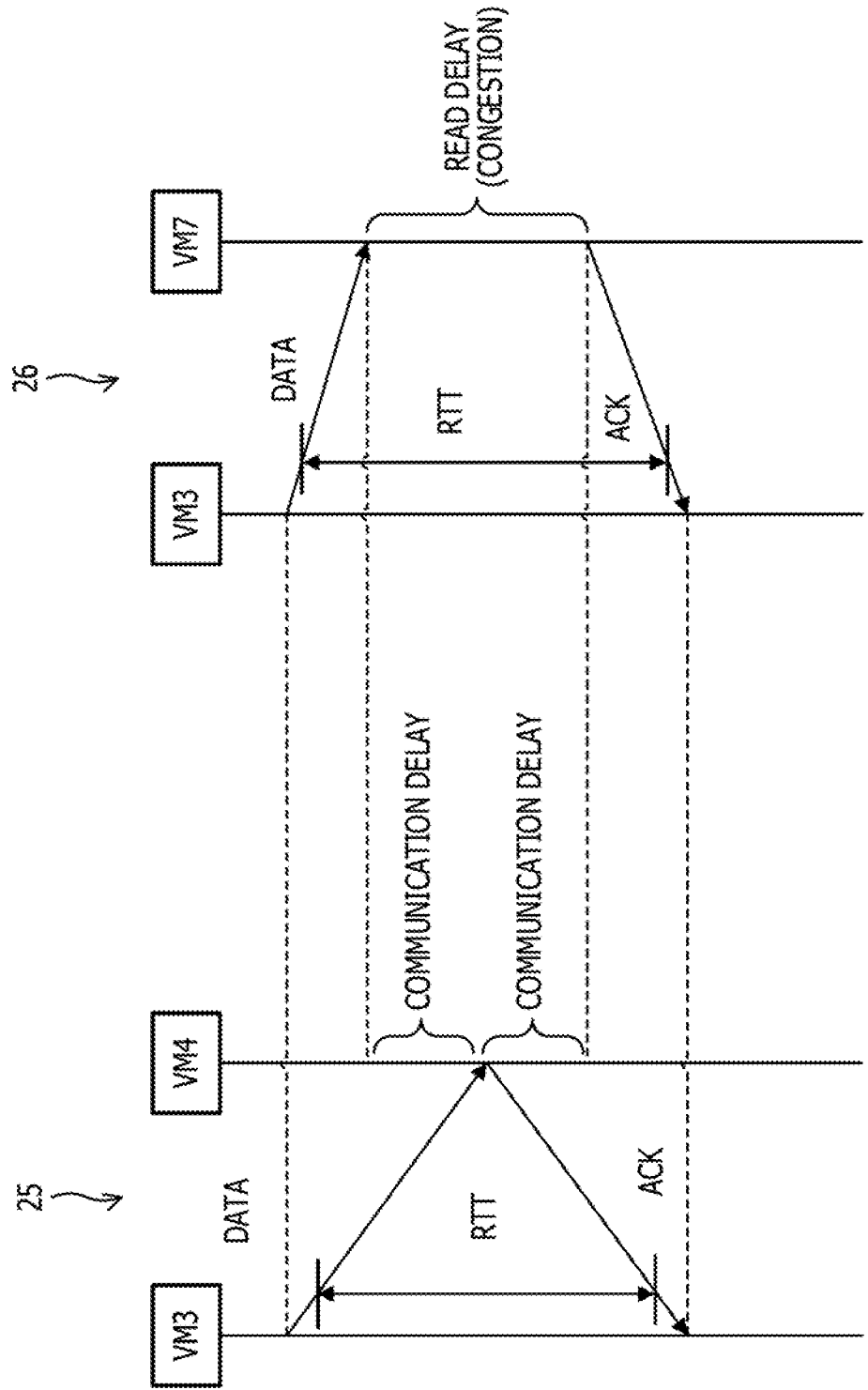
FIG. 5 is an explanatory diagram for explaining communication between virtual machine.

However, a case of the virtual system is different from the packet communication between the physical servers. FIG. 5 illustrates a diagram for explaining a decrease in communication speed between virtual machines (a network delay) and congestion of a virtual machine serving as a transmission destination in communication between virtual machines. As illustrated in FIG. 5, in communication 25 between the virtual machines VM3 and VM4, it is possible to determine, based on a measurement result of the RTT, whether or not a communication speed decreases. On the other hand, if, in communication 26 between the virtual machines VM3 and VM7, the virtual machine VM7 serving as a transmission destination is congested, read processing in the virtual machine VM7 serving as a transmission destination is delayed. In this case, since no packet arrives at a kernel of the virtual machine VM7 serving as a transmission destination and no ACK is sent back, there occurs a phenomenon in which the value of the RTT increases occurs even though a communication speed does not decrease.

In the virtual system 10, from a measurement result of the RTT, it is difficult to determine whether being a delay of a virtual network or congestion in the read processing in the virtual machine serving as a transmission destination. Therefore, there exists a problem that it is difficult to automatically analyze and monitor only communication packets between virtual machines, the communication speeds of which decrease.

Reduction in Communication Speed in Virtual System

In a case where communication between the virtual machines is low in speed in the virtual system 10, the number of packets in the input queues 21 in the virtual switch 16 increases. Note that in the present embodiment, packets are examples of data of the disclosed technology. In addition, in the present embodiment, the number of queued packets is called a queue length.

Figure 6:
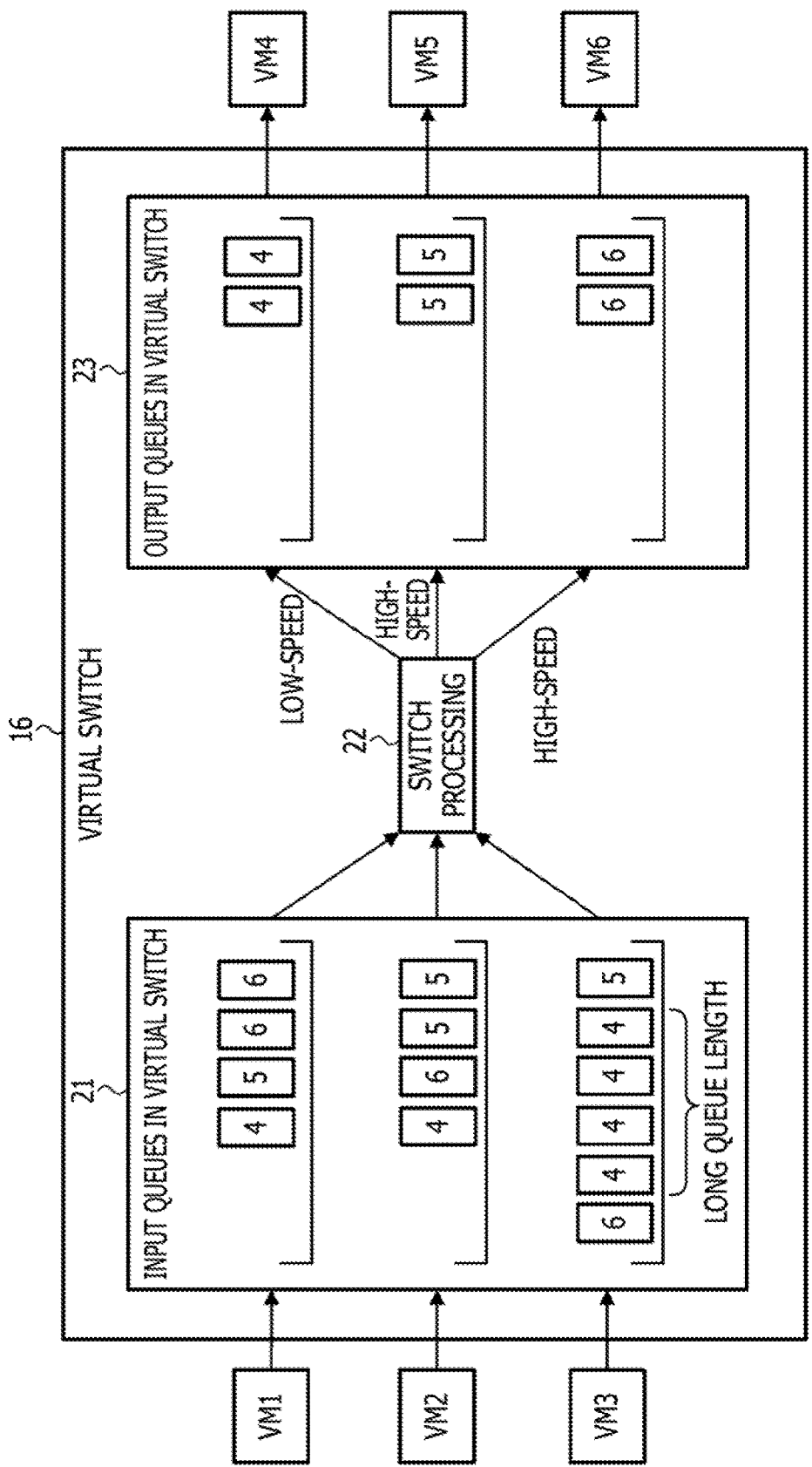
FIG. 6 is an explanatory diagram for explaining transfer processing in a virtual switch.

It may be thought that if, as illustrated in, for example, FIG. 6, packets of the virtual machine VM3 having a long queue length are subjected to mirroring, it becomes possible to automatically analyze and monitor communication packets between the virtual machines the speed of communication between which is low in speed.

However, in a case of setting mirroring for the virtual machine VM3 for which the corresponding one of the input queues 21 in the virtual switch 16 has a long queue length, mirroring turns out to be set for one of the virtual machines, which is a virtual machine serving as a transmission destination and in which congestion occurs, in the same way as the communication delay determination based on the RTT.

Specifically, in a case where the congestion occurs in the virtual machine serving as a transmission destination, the queue length of the corresponding one of the output queues 23 in the virtual switch 16 becomes long, the corresponding one of the output queues 23 being used for the virtual machine in which the congestion occurs. As illustrated in, for example, FIG. 7, in a case where congestion occurs in the virtual machine VM5 serving as a transmission destination, the queue length of the corresponding one of the output queues 23 in the virtual switch 16 becomes long, the corresponding one of the output queues 23 being used for the virtual machine VM5 serving as a transmission destination.

Figure 7:
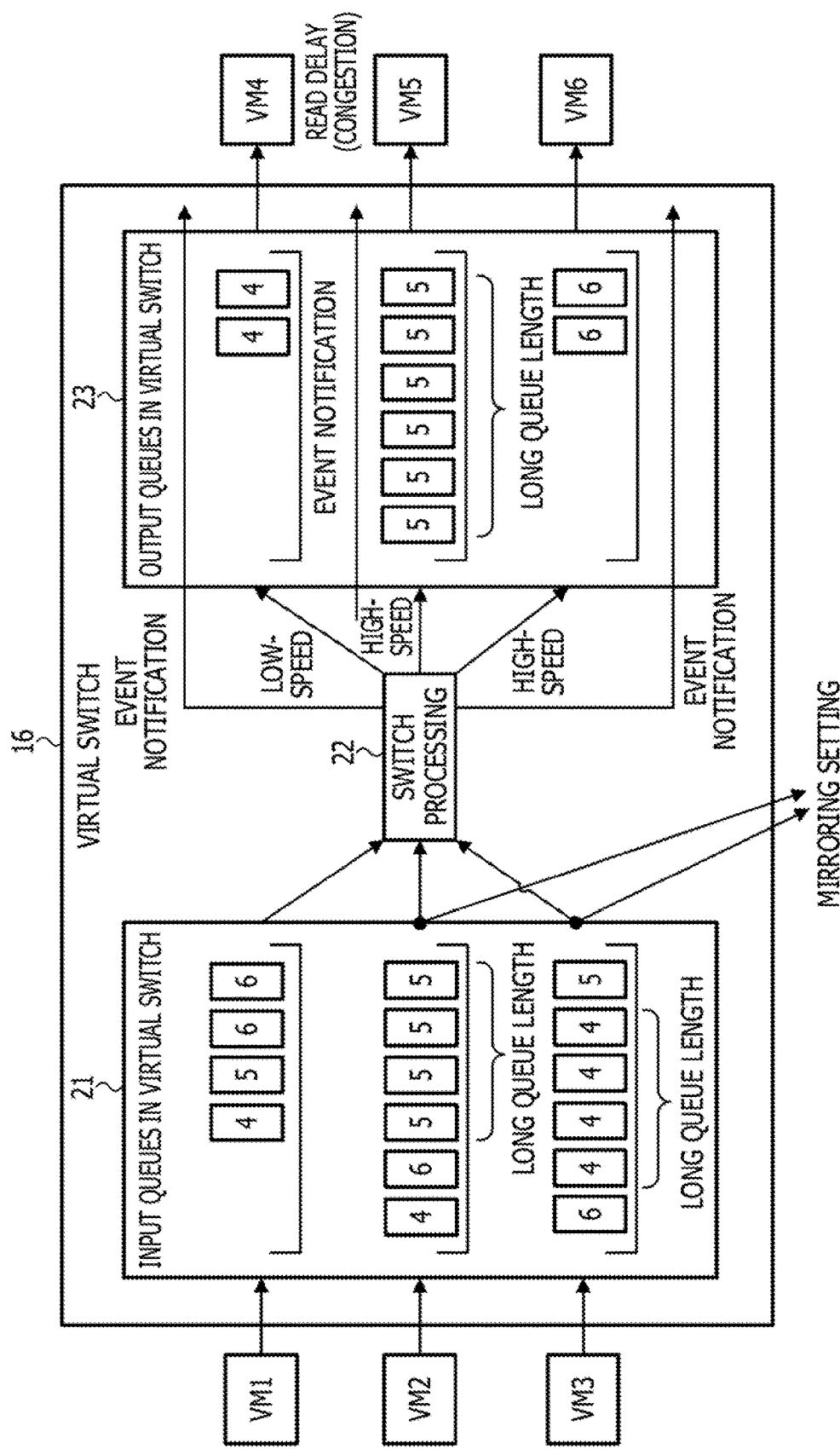
FIG. 7 is an explanatory diagram for explaining the transfer processing in the virtual switch.

Here, in a case of such communication between the virtual machines as illustrated in the above-mentioned FIG. 7, arrival of a packet is given notice of after the virtual switch 16 queues the packet in the output queue 23 used for the virtual machine serving as a transmission destination. Therefore, the virtual switch 16 notifies the virtual machine serving as a transmission destination of an event. The number of the event notifications is limited, and if the corresponding one of the output queues 23 in the virtual switch 16 has a number greater than or equal to a certain level, it becomes difficult for the virtual switch 16 to send a packet arrival event notification to the virtual machine serving as a transmission destination. As a result, it is difficult for the switch processing to connect a queue to the corresponding one of the output queues 23 in the virtual switch 16, and packets addressed to the virtual machine in which the congestion occurs are accumulated in the corresponding one of the input queues 21 in the virtual switch 16. In addition, as illustrated in FIG. 7, a queue length of the input queue 21 of the virtual machine VM2 serving as a transmission source becomes long.

In other words, in a case where determination of mirroring is performed only based on a queue length of the corresponding one of the input queues 21 in the virtual switch 16, the mirroring turns out to be set for communication between virtual machines in which communication between the virtual machines is high in speed. For, for example, a pair of the virtual machine VM2 serving as a transmission source and the virtual machine VM5 serving as a transmission destination, illustrated in the above-mentioned FIG. 7, mirroring turns out to be set.

Figure 8:
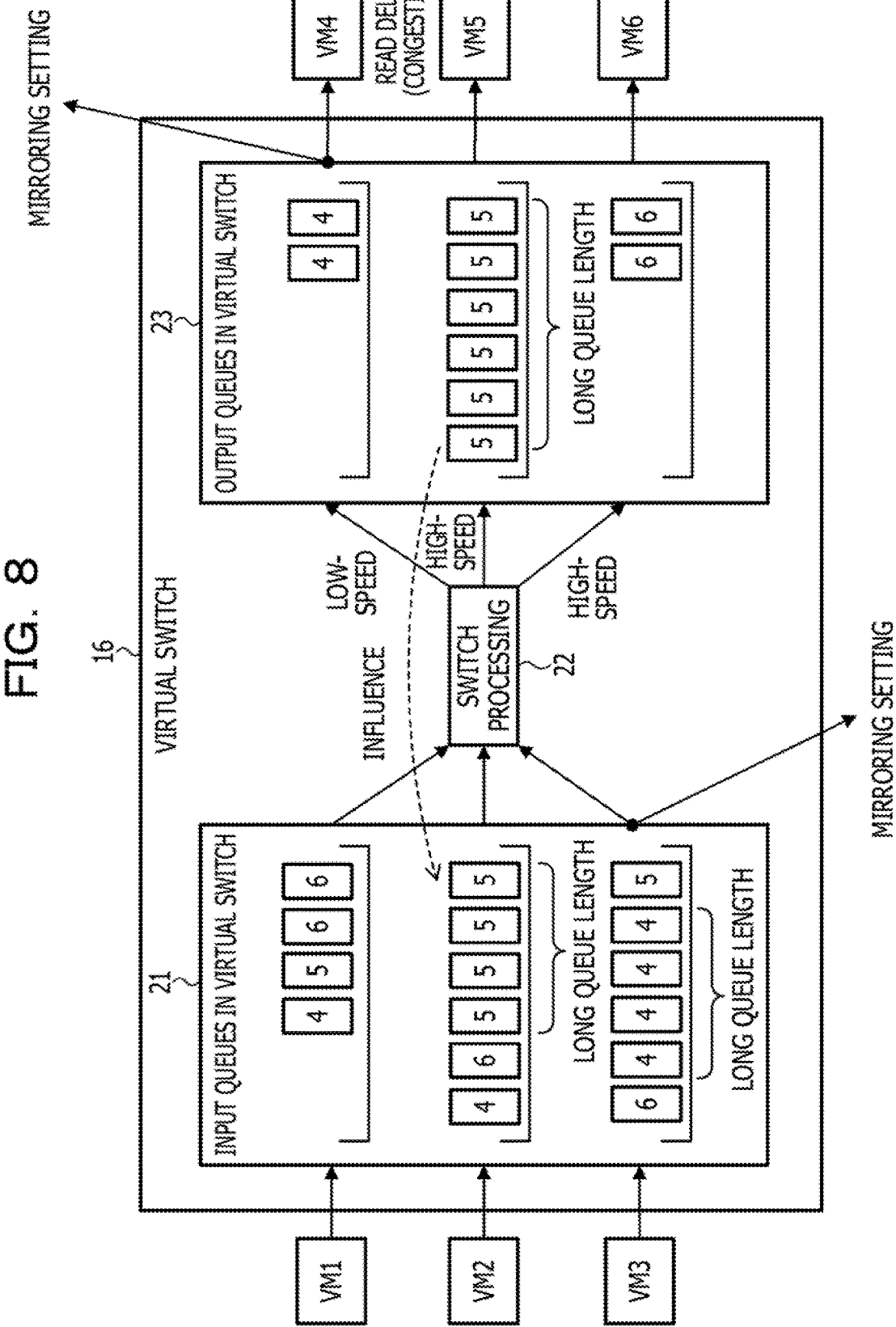
FIG. 8 is an explanatory diagram for explaining the transfer processing in the virtual switch.

In addition, as illustrated in FIG. 8, in a case where the virtual machine VM5 serving as a transmission destination is congested, the queue length of the output queue 23 used for the virtual machine VM5 that serves as a transmission destination and in which congestion occurs becomes long, and the influence thereof causes a queue length of data addressed to the virtual machine VM5 serving as a transmission destination to be characterized by becoming long in the corresponding one of the input queues 21.

Therefore, it may be considered that queue lengths of pieces of data of the respective virtual machines serving as transmission sources, the lengths of pieces of dada being addressed to the respective virtual machines serving as transmission destinations, within the input queues 21 in the virtual switch 16 and queue lengths of pieces of data addressed to the respective virtual machines serving as transmission destinations within the output queues 23 in the virtual switch 16 are periodically measured. In addition, it may be considered that one of the virtual machines serving as transmission destinations, which has a long queue length, is searched for, based on queue lengths of pieces of dada addressed to the respective virtual machines serving as transmission destinations within the input queues 21.

As illustrated in, for example, the above-mentioned FIG. 8, regarding the virtual machine VM2 serving as a transmission source, the virtual machine VM5 serving as a transmission destination is searched for, and regarding the virtual machine VM3 serving as a transmission source, the virtual machine VM4 serving as a transmission destination is searched for. Next, within virtual machines that serve as transmission destinations and that have long queue lengths within the input queues 21, one of the virtual machines, which serves as a transmission destination and for which the corresponding one of the output queues 23 has a long queue length, is searched for. As a result of the search, the virtual machine VM5 serving as a transmission destination in FIG. 8 is searched for, for example.

In the virtual machine VM5 that serves as a transmission destination and for which the queue length of the corresponding one of the output queues 23 becomes long, it may be determined that congestion of the virtual machine VM5 serving as a transmission destination is a cause. In addition, in the virtual machine VM4 that serves as a transmission destination and for which the queue length of the corresponding one of the output queues 23 does not become long, it may be determined that communication between virtual machines, performed between the virtual machine VM3 serving as a transmission source and the virtual machine VM4 serving as a transmission destination, is low-speed communication.

As illustrated in the above-mentioned FIG. 8, if the communication between the virtual machine VM3 and the virtual machine VM4 is low in speed, mirroring is set for the input queue 21 of the virtual machine VM3 serving as a transmission source, thereby enabling to analyze and monitor the low-speed communication. Alternatively, mirroring is set for the virtual machine VM4 serving as a transmission destination, thereby enabling to analyze and monitor the low-speed communication.

Figure 9:
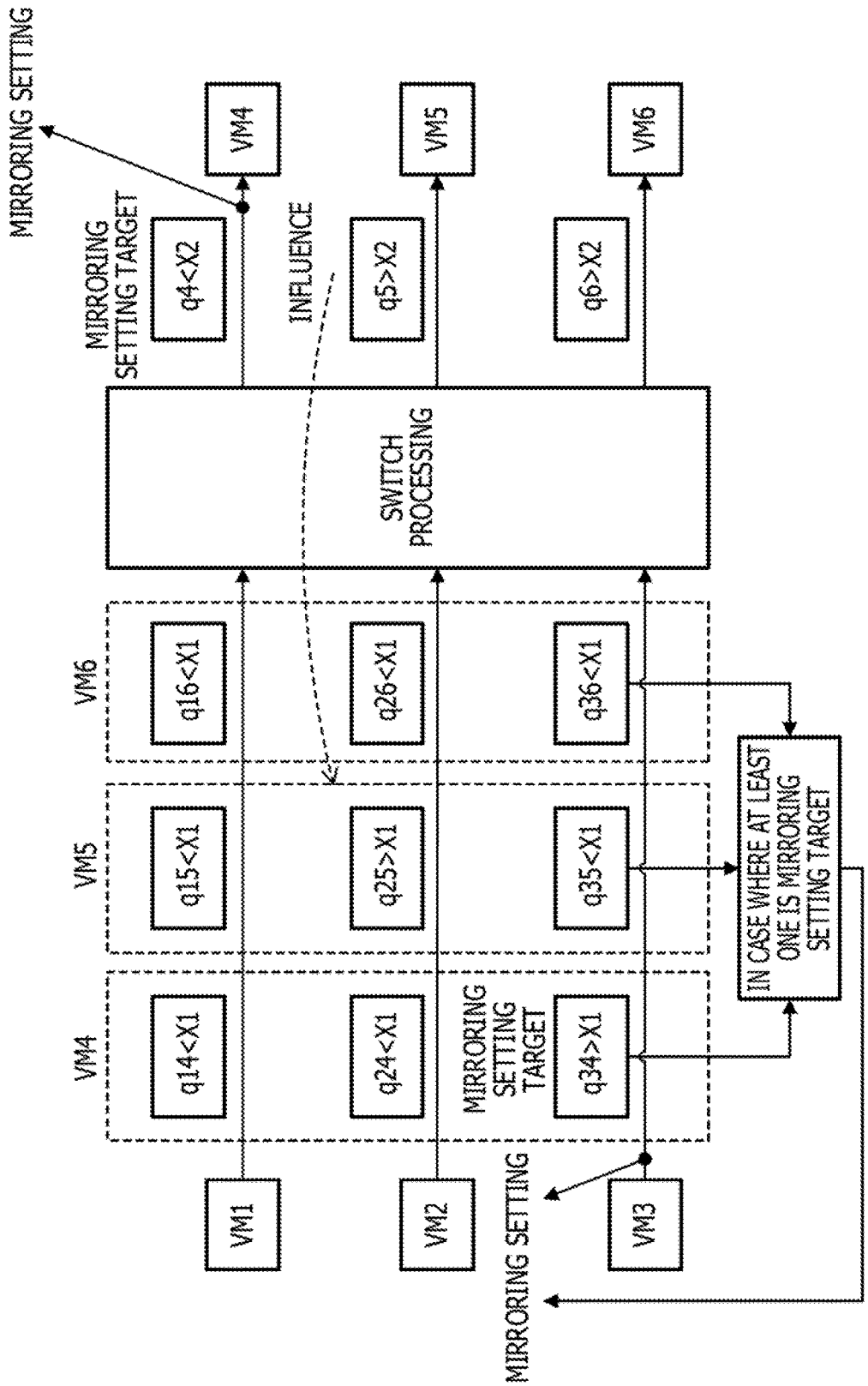
FIG. 9 is an explanatory diagram for explaining the transfer processing in the virtual switch.

FIG. 9 illustrates a specific example. Note that, in the following description, "qxy" indicates a queue length of data addressed by the virtual machine VMx serving as a transmission source to the virtual machine VMy serving as a transmission destination within the corresponding one of the input queues 21, and "qz" indicates a queue length of data addressed to the virtual machine VMz serving as a transmission destination within the corresponding one of the output queues 23.

First, periodically (for example, every 100 msec), for each of the virtual machines serving as transmission sources, queue lengths of pieces of data addressed by the corresponding one of the input queues 21 to the respective virtual machines serving as transmission destinations are obtained.

As illustrated in, for example, FIG. 9, for the individual virtual machines VM1, VM2, and VM3 serving as transmission sources, queue lengths (q14, q15, q16, q24, q25, q26, q34, q35, and q36) of pieces of data addressed by the input queues 21 to the virtual machines VM4, VM5, and VM6 serving as transmission destinations are obtained.

Next, as illustrated in the above-mentioned FIG. 9, from the output queues 23 of the respective virtual machines VM4, VM5, and VM6 serving as transmission destinations, queue lengths (q4, q5, and q6) of pieces of data addressed to the respective virtual machines VM4, VM5, and VM6 serving as transmission destinations are obtained. In addition, queue lengths of pieces of data addressed to the respective virtual machines serving as transmission destinations, obtained from the corresponding one of the input queues 21 for each of the virtual machines serving as transmission sources, are compared with a predetermined threshold value X1. In addition, the queue lengths of pieces of data addressed to the respective virtual machines serving as transmission destinations, obtained from the respective output queues 23, are compared with a predetermined threshold value X2.

Here, as illustrated in FIG. 9, in a case where the queue lengths (q25, q34) of pieces of data addressed to the virtual machines VM4 and VM5 serving as transmission destinations, each greater than the threshold value X1, exist, it is determined whether the queue lengths (q4, q5) of pieces of data addressed to the respective virtual machines VM4 and VM5 serving as transmission destinations are each greater than the threshold value X2. In addition, in a case where the queue length of the output queue 23 of one of the virtual machines serving as transmission destinations is greater than the threshold value X2, it is determined that congestion occurs.

In the example of the above-mentioned FIG. 9, since the queue length q5 is greater than the threshold value X2, it is determined that with communication with the virtual machine VM5 serving as a transmission destination is high in speed, and it is determined that with congestion occurs in the virtual machine VM5 serving as a transmission destination.

On the other hand, since the queue length q4 of the output queue 23 of the virtual machine VM4 serving as a transmission destination is less than or equal to the threshold value X2, it is determined that with communication with the virtual machine VM4 serving as a transmission destination is low in speed.

In a case of setting mirroring for low-speed communication between virtual machines, at least one of the virtual machine serving as a transmission source and the virtual machine serving as a transmission destination only has to be subjected to mirroring.

In a case of subjecting the virtual machine serving as a transmission source to mirroring, mirroring is set for an output port from one of the virtual machines serving as transmission sources to the virtual switch 16, as illustrated in the above-mentioned FIG. 9, the output port being used for communication between virtual machines, determined as low in speed. In the example illustrated in FIG. 9, mirroring is set for an output port from the virtual machine VM3 serving as a transmission source to the virtual switch 16.

In a case of subjecting the virtual machine serving as a transmission destination to mirroring, mirroring is set for an output port from the virtual switch 16 to one of the virtual machines serving as transmission destinations, as illustrated in the above-mentioned FIG. 9, the output port being used for communication between virtual machines, determined as low in speed. In the example illustrated in FIG. 9, mirroring is set for an output port from the virtual switch 16 to the virtual machine VM4.

Problem with Determination Method Only Based on Queue Length

However, in the above-mentioned method in which queue lengths of packets are simply determined only based on threshold values, it is difficult to measure a change in a temporal increase in queue length. Therefore, in a case where a traffic amount is large and a state in which a queue length exceeds a threshold value continues, even though a virtual machine for which communication is low in speed exists, it is determined that congestion occurs in a virtual machine serving as a transmission destination. Therefore, it is difficult to detect low-speed communication between virtual machines.

Figure 10:
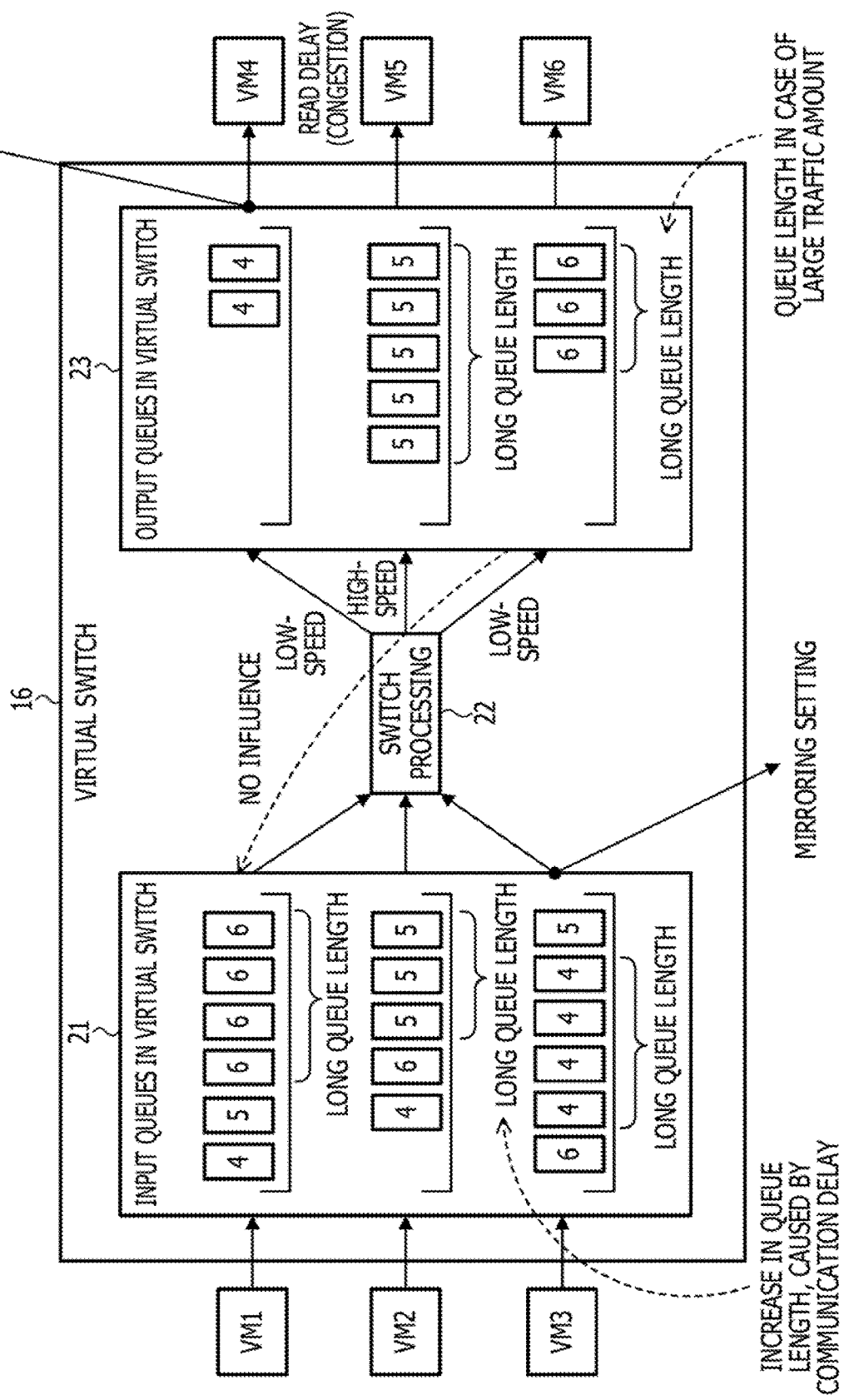
FIG. 10 is an explanatory diagram for explaining the transfer processing in the virtual switch.

FIG. 10 illustrates an example in which low-speed communication between virtual machines is not detected in a case of a large traffic amount. There will be considered a case where, as illustrated in, for example, FIG. 10, as communication between virtual machines, performed between the virtual machine VM1 serving as a transmission source and the virtual machine VM6 serving as a transmission destination, is low in speed. In a case where, in communication between the virtual machine VM1 serving as a transmission source and the virtual machine VM6 serving as a transmission destination, a state in which a queue length of the corresponding one of the input queues 21 and the queue length of the corresponding one of the output queues 23 exceed respective threshold values is caused to continue by a large traffic amount, it is difficult to distinguish from congestion in the virtual machine serving as a transmission destination. Therefore, even if communication between virtual machines, performed between the virtual machine VM1 serving as a transmission source and the virtual machine VM6 serving as a transmission destination, is low in speed, a phenomenon in which it is difficult to detect the low-speed communication between the virtual machines occurs.

Outline of Present Embodiment

As described above, if congestion of the virtual machine serving as a transmission destination occurs and a queue length of the corresponding one of the output queues 23 in the virtual switch 16 increases to have a number greater than or equal to a certain level, it becomes difficult for the virtual switch 16 to send a packet arrival event notification to the virtual machine serving as a transmission destination. Therefore, it becomes difficult to connect a queue to the corresponding one of the output queues 23 in the virtual switch 16, and packets addressed to the virtual machine serving as a transmission destination in which the congestion occurs are accumulated in the corresponding one of the input queues 21 in the virtual switch 16. Accordingly, a queue length of the corresponding one of the input queues 21 in the virtual switch 16 increases.

Figure 11:
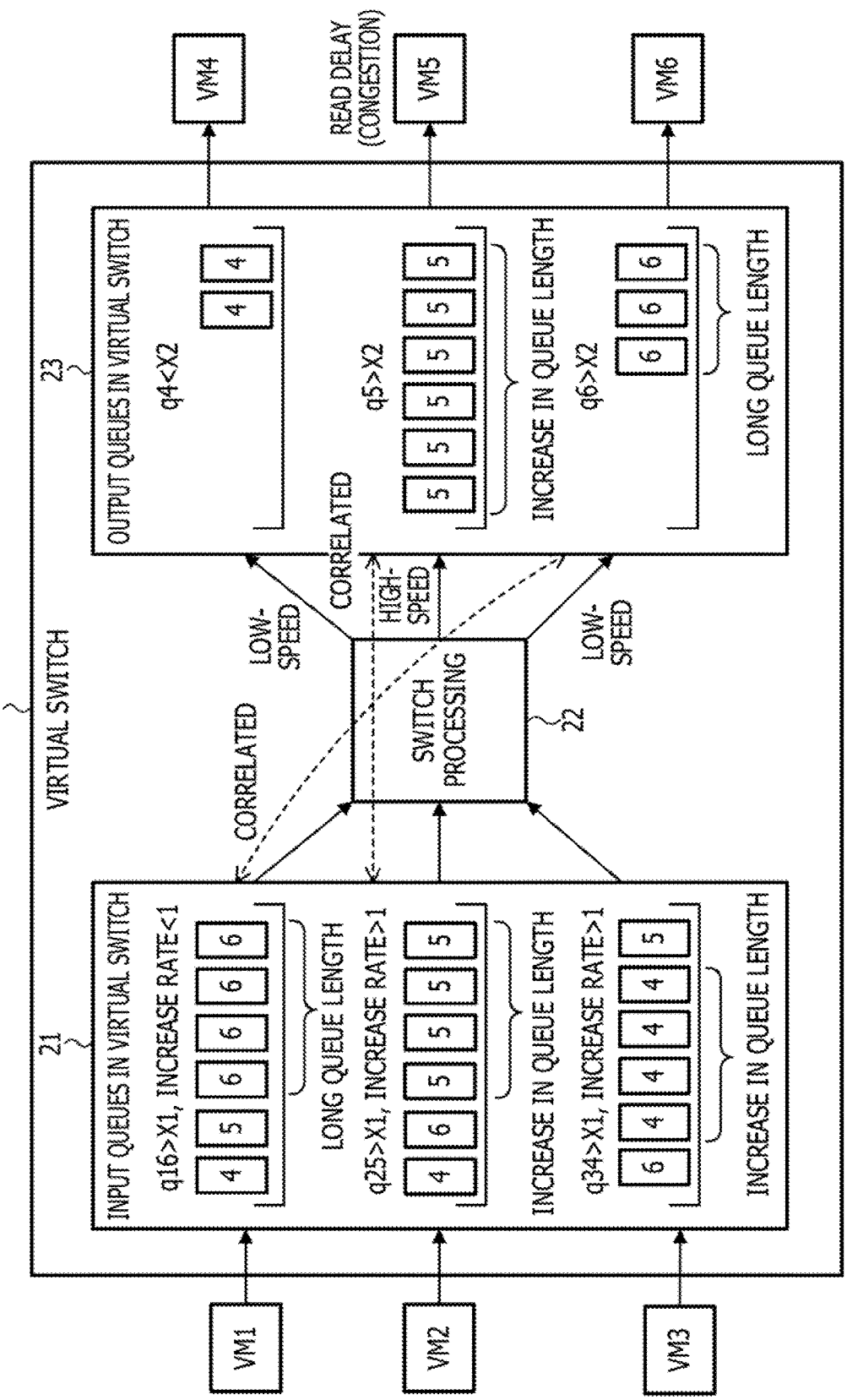
FIG. 11 is an explanatory diagram for explaining the transfer processing in the virtual switch.

In a case where congestion occurs, a correlation between a temporal transition of a queue length of the corresponding one of the input queues 21 in the virtual switch 16 and the queue length of the corresponding one of the output queues 23 becomes high. As illustrated in, for example, FIG. 11, a correlation between a temporal transition of a queue length of data addressed to the virtual machine VM5 serving as a transmission destination, the data being included in the input queue 21 of the virtual machine VM2 serving as a transmission source, and a temporal transition of the queue length of the output queue 23 of the virtual machine VM5 serving as a transmission destination becomes high.

On the other hand, in a case where a traffic amount is large, a correlation between a queue length of the corresponding one of the input queues 21 and the queue length of the corresponding one of the output queues 23 becomes high. The reason is that an increase in the traffic amount causes communication between virtual machines to be low in speed, and a state in which a queue length of the corresponding one of the input queues 21 in the virtual switch 16 exceeds a threshold value continues, thereby causing the queue length of the corresponding one of the output queues 23 to continue a state of exceeding a threshold value. As illustrated in, for example, the above-mentioned FIG. 11, in communication between the virtual machine VM1 serving as a transmission source and the virtual machine VM6 serving as a transmission destination, a traffic amount is large. Therefore, communication between the virtual machines becomes low in speed, and a correlation between queue lengths becomes high.

Therefore, by simply using only a correlation between the queue lengths, it is difficult to identify a case where a large traffic amount causes communication between virtual machines to become low in speed.

Here, in a case where an increase rate of a queue length of the corresponding one of the input queues 21 is high in communication between virtual machines in which a correlation between queue lengths is high, it may be determined that congestion occurs in the virtual machine serving as a transmission destination. The reason is that an increase in the queue length of the corresponding one of the output queues 23 influences a queue length of the corresponding one of the input queues 21, thereby increasing a queue length of the corresponding one of the input queues 21.

On the other hand, in a case where an increase rate of a queue length of the corresponding one of the input queues 21 is low in communication between virtual machines in which a correlation between queue lengths is high, it may be determined that the communication between virtual machines is low in speed.

Therefore, in the present embodiment, a pair of virtual machines in a case where a queue length of data that is addressed to the corresponding one of the virtual machines serving as transmission destinations and that is included in the input queue 21 of the corresponding one of the virtual machines serving as transmission sources is long, a correlation between queue lengths is high between the input queue 21 of the corresponding one of the virtual machines serving as transmission sources and the output queue 23 of the corresponding one of the virtual machines serving as transmission destinations is high, and an increase rate of the queue length of data that is addressed to the corresponding one of the virtual machines serving as transmission destinations and that is included in the corresponding one of the input queues 21 is low is identified as a mirroring target. In addition, a pair of virtual machines in a case where a queue length of data that is addressed to the corresponding one of the virtual machines serving as transmission destinations and that is included in the input queue 21 of the corresponding one of the virtual machines serving as transmission sources is long and a correlation between a queue length of the corresponding one of the input queues 21 and the queue length of the corresponding one of the output queues 23 is low is identified as a mirroring target.

Hereinafter, embodiments will be described in detail. Note that in the following embodiments, an analysis apparatus to analyze communication between virtual machines in a virtual system will be described as an example.

Embodiments

Figure 12:
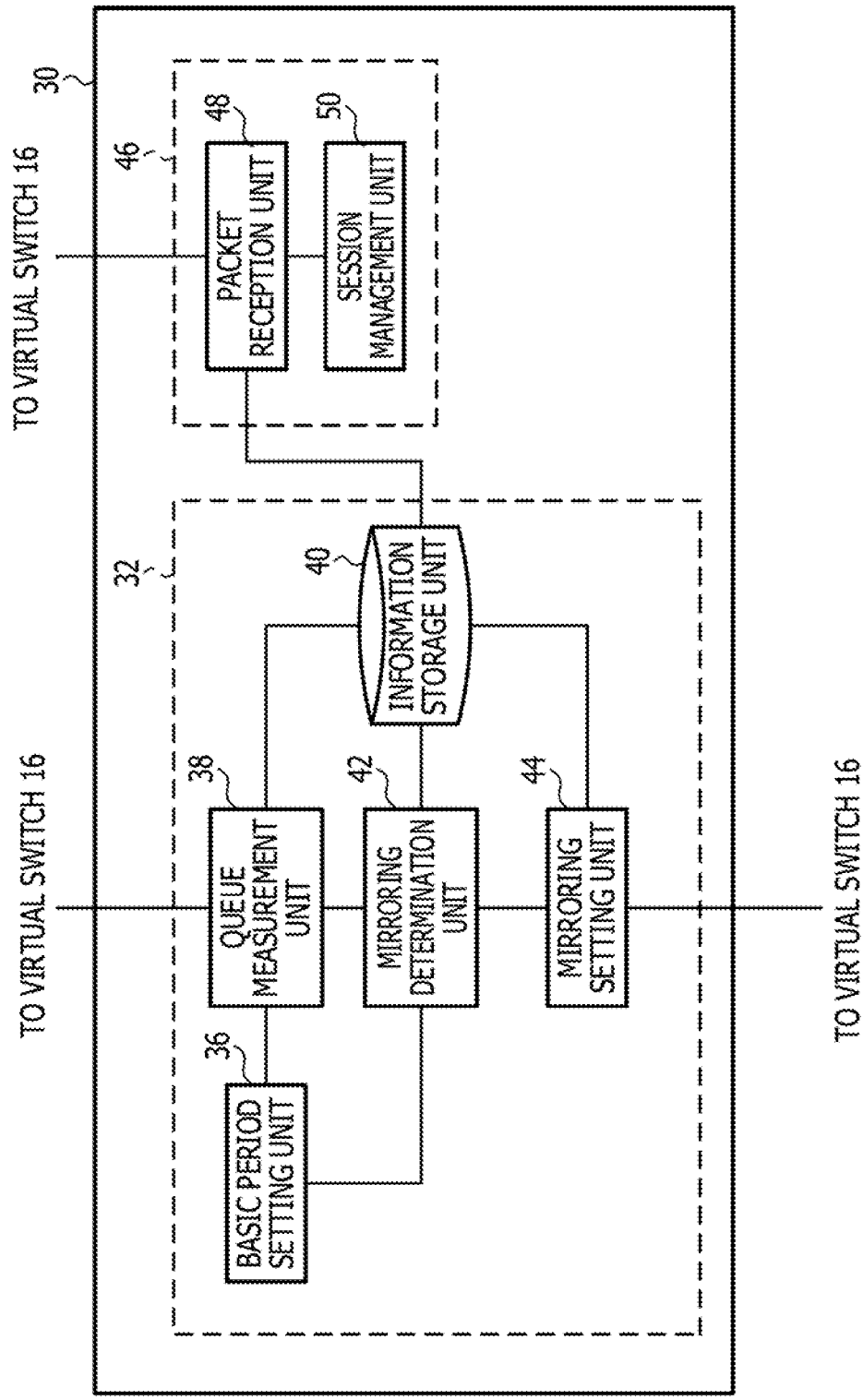
FIG. 12 is a block diagram of an analysis apparatus of the present embodiment.
Figure 13:
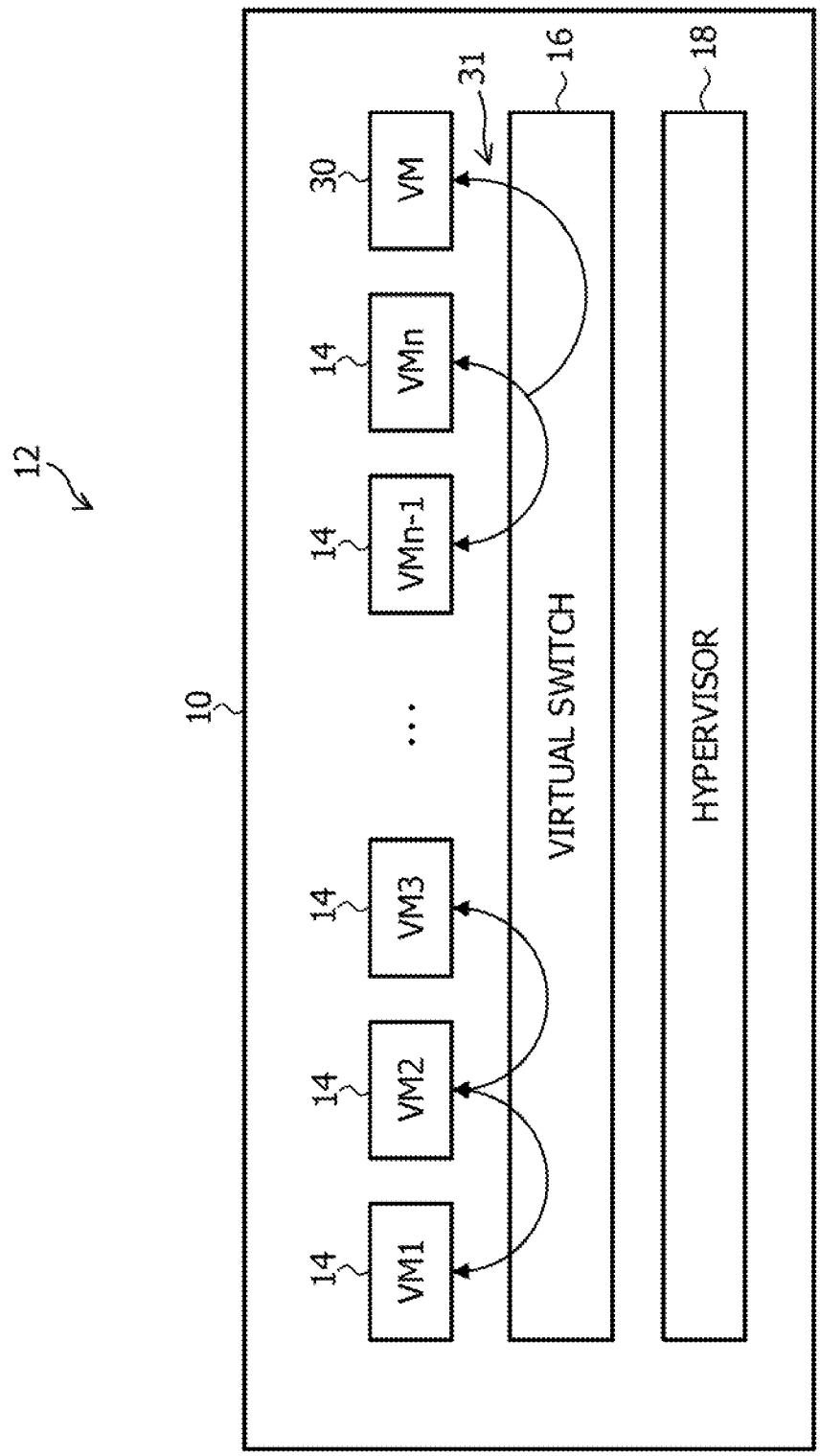
FIG. 13 is a diagram for explaining a relationship between the virtual system and the analysis apparatus.

As illustrated in FIG. 12, an analysis apparatus 30 according to the present embodiment includes a virtual switch management function unit 32 and a Layer4 (L4) analysis function unit 46. In the present embodiment, as illustrated in FIG. 13, one of the virtual machines included in the virtual system 10 is caused to function as the analysis apparatus 30.

The analysis apparatus 30 subjects a port of the virtual switch 16 to mirroring 31, thereby analyzing communication between virtual machines.

The virtual switch management function unit 32 includes a basic period setting unit 36, a queue measurement unit 38, an information storage unit 40, a mirroring determination unit 42, and a mirroring setting unit 44. The information storage unit 40 is an example of a storage unit of the disclosed technology. In addition, the mirroring determination unit 42 is an example of an identification unit of the disclosed technology.

The basic period setting unit 36 causes the queue measurement unit 38 and the mirroring determination unit 42 to periodically operate. In the present embodiment, a case where the basic period setting unit 36 causes the queue measurement unit 38 to operate every 100 msec and causes the mirroring determination unit 42 to operate every 1000 msec will be described as an example.

In accordance with a period set by the basic period setting unit 36, the queue measurement unit 38 measures queue lengths of the input queues 21 in the virtual switch 16. Specifically, for each of virtual machines serving as transmission sources, the queue measurement unit 38 measures queue lengths of pieces of data addressed to respective virtual machines serving as transmission destinations, the pieces of data being included in the input queue 21 of the relevant virtual machine serving as a transmission source. In addition, the queue measurement unit 38 stores, in the information storage unit 40, a measurement result as input queue information.

In addition, in accordance with a period set by the basic period setting unit 36, the queue measurement unit 38 measures the queue lengths of the respective output queues 23 in the virtual switch 16. Specifically, for each of virtual machines serving as transmission destinations, the queue measurement unit 38 measures the queue length of the output queue 23 of the relevant virtual machine serving as a transmission destination. In addition, the queue measurement unit 38 stores, in the information storage unit 40, a measurement result as output queue information.

In the information storage unit 40, an input queue table and an output queue table, which indicate measurement results obtained by the queue measurement unit 38, and a mirroring setting table storing therein information of virtual machines serving as mirroring targets are stored.

FIG. 14 illustrates an example of an input queue table 52 stored in the information storage unit 40. In the input queue table 52, the input queue information measured by the queue measurement unit 38 is stored in a temporal sequence. In the input queue table 52 illustrated in FIG. 14, the input queue information at each periodic time is stored. In the input queue table 52 illustrated in FIG. 14, a case where the virtual machines serving as transmission sources are the virtual machine VM1, the virtual machine VM2, the virtual machine VM3, . . . , and the virtual machine VMn is illustrated as an example. In addition, in the input queue table 52 illustrated in FIG. 14, a case where the virtual machines serving as transmission destinations are the virtual machine VM4, the virtual machine VM5, and the virtual machine VM6 is illustrated as an example.

In addition, FIG. 15 illustrates an example of an output queue table 54 stored in the information storage unit 40. In the output queue table 54, the output queue information measured by the queue measurement unit 38 is stored in a temporal sequence. In the output queue table 54 illustrated in FIG. 15, the output queue information at each periodic time is stored. In the output queue table 54 illustrated in FIG.

15, a case where the virtual machines serving as transmission destinations are the virtual machine VM4, the virtual machine VM5, the virtual machine VM6, . . . , and the virtual machine VMm is illustrated as an example.

In addition, FIG. 16 illustrates an example of a mirroring setting table 56 stored in the information storage unit 40. In the mirroring setting table 56, information indicating the initiation of mirroring or the suspension of mirroring is stored for each of pairs of the virtual machines serving as transmission sources and the virtual machines serving as transmission destinations. A case where an item corresponding to a pair of a virtual machine serving as a transmission source and a virtual machine serving as a transmission destination is "1" indicates the initiation of mirroring, and a case of "0" indicates the suspension of mirroring. In the mirroring setting table 56 illustrated in FIG. 16, a case where the virtual machines serving as transmission sources are the virtual machine VM1, the virtual machine VM2, the virtual machine VM3, . . . , and the virtual machine VMn is illustrated as an example. In addition, in the mirroring setting table 56 illustrated in FIG. 16, a case where the virtual machines serving as transmission destinations are the virtual machine VM4, the virtual machine VM5, and the virtual machine VM6 is illustrated as an example.

In accordance with a period set by the basic period setting unit 36, the mirroring determination unit 42 reads, from the information storage unit 40, a temporal sequence of the input queue information and a temporal sequence of the output queue information.

Next, based on the temporal sequence of the input queue information, the mirroring determination unit 42 determines whether or not a queue length of data addressed to the corresponding one of the virtual machines serving as transmission destinations, the data being included in the corresponding one of the input queues 21, is greater than or equal to a first threshold value.

Note that, based on the input queue information stored the input queue table 52 in the information storage unit 40, the mirroring determination unit 42 determines whether or not a queue length of data related to the corresponding one of the virtual machines serving as transmission destinations (a queue length of data addressed to the corresponding one of the virtual machines serving as transmission destinations), the data being included in the input queue 21 of the corresponding one of the virtual machines serving as transmission sources, is greater than or equal to the first threshold value. The first threshold value is preliminarily set. In the present embodiment, a queue length of "100" is used as the first threshold value.

In addition, in a case of determining whether or not the queue length is greater than or equal to the first threshold value, the mirroring determination unit 42 determines, based on one of pieces of the input queue information included in the read temporal sequence of the input queue information, whether or not a queue length of data addressed to the corresponding one of the virtual machines serving as transmission destinations is greater than or equal to the first threshold value. In the present embodiment, a case of determining, based on the latest input queue information, whether or not a queue length of data addressed to the corresponding one of the virtual machines serving as transmission destinations is greater than or equal to the first threshold value will be descried as an example.

Next, the mirroring determination unit 42 obtains a correlation coefficient between a temporal transition of a queue length of data addressed to the corresponding one of the virtual machines serving as transmission destinations, the data being included in the input queue 21 of the corresponding one of the virtual machines serving as transmission sources, and a temporal transition of the queue length of the output queue 23 of the corresponding one of the virtual machines serving as transmission destinations.

Specifically, based on the temporal sequences of the input queue information and the output queue information, the mirroring determination unit 42 obtains the correlation coefficient in accordance with, for example, the following Expression (1). Note that the correlation coefficient is an example of a value of a correlation of the disclosed technology.

$$-1 \leq r = \frac{S(xy)}{\sqrt{S(xx)S(yy)}} \leq 1 \qquad (1)$$

$$S(xx) = \sum_{i=1}^{n} x_i^2 - \frac{\left(\sum_{i=1}^{n} x_i\right)^2}{n}, \; S(yy) = \sum_{i=1}^{n} y_i^2 - \frac{\left(\sum_{i=1}^{n} y_i\right)^2}{n},$$

$$S(xy) = \sum_{i=1}^{n} x_i y_i - \frac{\sum_{i=1}^{n} x_i \sum_{i=1}^{n} y_i}{n}$$

Note that "i" of the above-mentioned Expression (1) indicates a time and "n" thereof indicates a preliminarily set time interval. Since, in the present embodiment, determination of mirroring is performed every 1000 msec, "n" turns out to correspond to 1000 msec. "xi" indicates a queue length of data addressed to the corresponding one of the virtual machines serving as transmission destinations, the queue length being measured at a time "i", the data being included in the input queue 21 of the corresponding one of the virtual machines serving as transmission sources, and "yi" indicates the queue length of the output queue 23 of the corresponding one of the virtual machines serving as transmission destinations, the queue length being measured at the time "i". Note that the value of a correlation is not limited to an example of the correlation coefficient illustrated in the above-mentioned Expression (1).

Next, the mirroring determination unit 42 determines whether or not the obtained correlation coefficient is greater than a second threshold value. The second threshold value is preliminarily set. In the present embodiment, "0.7" is used as the second threshold value.

In addition, the mirroring determination unit 42 calculates an increase rate of a queue length of data addressed to the corresponding one of the virtual machines serving as transmission destinations, the data being included in the input queue 21 of the corresponding one of the virtual machines serving transmission sources. Specifically, the mirroring determination unit 42 obtains an increase rate of a queue length of data addressed to the corresponding one of the virtual machines serving as transmission destinations, the data being included, during a given period of time, in the input queue 21 of the corresponding one of the virtual machines serving transmission sources. Note that, in the present embodiment, it is assumed that 1000 msec serving as a period with which the mirroring determination unit 42 is caused to operate is the given period of time. In addition, regarding the increase rate of a queue length, in a case where "y" is a queue length and "x" is a time, an approximate expression of "y=ax+b" is calculated, and "a" is calculated as the increase rate. Note that "b" is a given number obtained along with "a".

Next, the mirroring determination unit 42 determines whether or not the obtained increase rate is less than or equal to a third threshold value. The third threshold value is preliminarily set. In the present embodiment, "1" is used as the third threshold value.

In addition, the mirroring determination unit 42 identifies, as a mirroring target, a pair of the corresponding one of the virtual machines serving as transmission sources and the corresponding one of the virtual machines serving as transmission destinations.

Specifically, the mirroring determination unit 42 identifies, as a mirroring target, a pair of the corresponding one of the virtual machines serving as transmission sources and the corresponding one of the virtual machines serving as transmission destinations, in which a queue length of the corresponding one of the input queues 21 is greater than or equal to the first threshold value and the obtained correlation coefficient is less than or equal to the second threshold value. In a case where the correlation coefficient is less than or equal to the second threshold value, it is determined that communication between virtual machines is low in speed and a queue length of data addressed to the corresponding one of the virtual machines serving as transmission destinations increases, the data being included in the input queue 21 of the corresponding one of the virtual machines serving as transmission sources.

In addition, the mirroring determination unit 42 identifies, as a mirroring target, a pair of the corresponding one of the virtual machines serving as transmission sources and the corresponding one of the virtual machines serving as transmission destinations, in which a queue length of the corresponding one of the input queues 21 is greater than or equal to the first threshold value, the obtained correlation coefficient is greater than the second threshold value, and the obtained increase rate is less than or equal to the third threshold value. In a case where the increase rate is less than or equal to the third threshold value, a traffic amount is large and a queue length of the corresponding one of the input queues 21 continuously exceeds the threshold value. Therefore, it is determined that low-speed communication between the virtual machines causes a queue length of the corresponding one of the input queues 21 to increase. On the other hand, in a case where the increase rate is greater than the third threshold value, it is determined that congestion of the corresponding one of the virtual machines serving as transmission destinations causes a queue length of the corresponding one of the input queues 21 to increase, and it is not determined that low-speed communication between the virtual machines causes a queue length to increase.

In addition, in accordance with a result of identification of a mirroring target, the mirroring determination unit 42 updates the mirroring setting table 56 in the information storage unit 40.

The mirroring setting unit 44 reads information from the mirroring setting table 56 in the information storage unit 40 and sets mirroring for communication between the corresponding one of the virtual machines serving as transmission sources and the corresponding one of the virtual machines serving as transmission destinations that are identified as mirroring targets.

Specifically, in a case of subjecting the corresponding one of the virtual machines serving as transmission sources to mirroring, the mirroring setting unit 44 takes, based on a pair of the corresponding one of the virtual machines serving as transmission sources and the corresponding one of the virtual machines serving as transmission destinations, which is identified as a mirroring target, a logical sum in the virtual machines serving as transmission destinations of the input queue 21 of the relevant virtual machine serving as a transmission source. In addition, in a case where there is at least one virtual machine serving as a transmission destination, identified, based on a combination with the relevant virtual machine serving as a transmission source, as a mirroring target, the mirroring setting unit 44 sets mirroring for a port from the relevant virtual machine serving as a transmission source to the virtual switch 16.

In addition, in a case of subjecting the corresponding one of the virtual machines serving as transmission destinations to mirroring, the mirroring setting unit 44 sets mirroring for a port from the virtual switch 16 to the relevant virtual machine serving as a transmission destination.

The L4 analysis function unit 46 has an L4 analysis function and analyzes a packet subjected to mirroring by the mirroring setting unit 44. The L4 analysis function unit 46 includes a packet reception unit 48 and a session management unit 50.

The packet reception unit 48 reads, from the mirroring setting table 56 stored in the information storage unit 40, information of virtual machines serving as mirroring targets and receives packets transmitted and received between the virtual machines serving as mirroring targets.

Based on packets received by the packet reception unit 48, the session management unit 50 analyzes communication between the virtual machines.

Next, processing in the analysis apparatus 30 will be specifically described with reference to FIG. 17 to FIG. 19.

Every 100 msec serving as a period set by the basic period setting unit 36, the queue measurement unit 38 measures a queue length of data addressed to each of the virtual machines serving as transmission destinations, the data being included in the corresponding one of the input queues 21, and the queue lengths of the output queues 23. In measurement processing performed by the queue measurement unit 38, as illustrated in FIG. 17, the queue measurement unit 38 measures the queue lengths (q14, q15, q16, q24, q25, q26, q34, q35, and q36) of pieces of data addressed to the individual virtual machines serving as transmission destinations, the pieces of data being included in the input queues 21 of the respective virtual machines serving as transmission sources. In addition, the queue measurement unit 38 measures the queue lengths (q4, q5, and q6) of the output queues 23 for the respective virtual machines serving transmission destinations.

In addition, the queue measurement unit 38 stores, in the input queue table 52 in the information storage unit 40, measurement results of queue lengths of the input queues 21. In addition, the queue measurement unit 38 stores, in the output queue table 54 in the information storage unit 40, measurement result of the queue lengths of the output queues 23.

Every 1000 msec serving as a period set by the basic period setting unit 36, the mirroring determination unit 42 reads, from the information storage unit 40, the temporal sequence of the input queue information and the temporal sequence of the output queue information.

The mirroring determination unit 42 reads, from the input queue table 52, the temporal sequences of the respective queue lengths q14, q15, and q16 of pieces of data addressed to the respective virtual machines VM4, VM5, and VM6 serving as transmission destinations, the pieces of data being included in the input queue 21 of the virtual machine VM1 serving as a transmission source, for example. In addition, the mirroring determination unit 42 reads, from the input queue table 52, the temporal sequences of the respective queue lengths q24, q25, and q26 of pieces of data addressed to the respective virtual machines VM4, VM5, and VM6 serving as transmission destinations, the pieces of data being included in the input queue 21 of the virtual machine VM2 serving as a transmission source. In addition, the mirroring determination unit 42 reads, from the input queue table 52, the temporal sequences of the respective queue lengths q34, q35, and q36 of pieces of data addressed to the respective virtual machines VM4, VM5, and VM6 serving as transmission destinations, the pieces of data being included in the input queue 21 of the virtual machine VM3 serving as a transmission source.

In addition, the mirroring determination unit 42 reads, from the output queue table 54 in the information storage unit 40, the temporal sequences of the queue length q4 of data addressed to the virtual machine VM4, the queue length q5 of data addressed to the virtual machine VM5, and the queue length q6 of data addressed to the virtual machine VM6 in the respective output queues 23.

In addition, based on the read latest queue lengths of the input queues 21, the mirroring determination unit 42 determines whether or not the queue length of data addressed to each of the virtual machines serving as transmission destinations is greater than or equal to "100".

Figure 18:
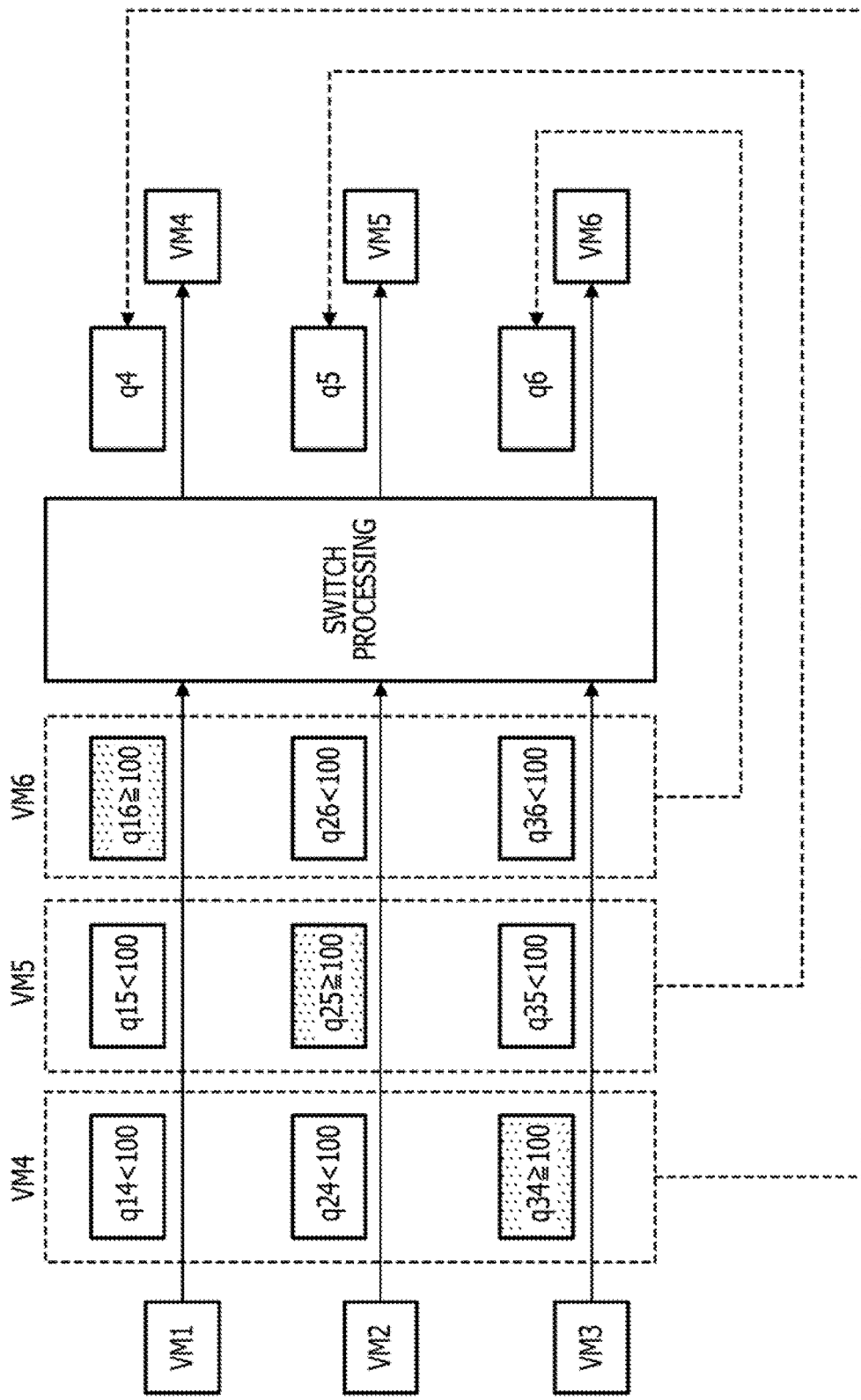
FIG. 18 is an explanatory diagram for explaining whether or not a queue length of an input queue is greater than or equal to a threshold value.

Specifically, as illustrated in FIG. 18, the mirroring determination unit 42 determines whether or not each of the queue lengths (q14, q15, q16, q24, q25, q26, q34, q35, and q36) of pieces of data addressed to the individual virtual machines serving as transmission destinations is greater than or equal to "100". As a result of the determination, as illustrated in FIG. 18, it is found that each of "q16", "q25", and "q34" is greater than or equal to "100".

Next, the mirroring determination unit 42 obtains a correlation coefficient between a temporal transition of a queue length of data addressed to the corresponding one of the virtual machines serving as transmission destinations, the data being included in the corresponding one of the input queues 21, and a temporal transition of the queue length of the output queue 23 of the relevant virtual machine serving as a transmission destination.

A correlation coefficient between the temporal transition of a queue length of data addressed to the virtual machine VM4 serving as a transmission destination, the data being included in the input queue 21 of the virtual machine VM1, and the temporal transition of the queue length of the output queue 23 of the virtual machine VM4 is calculated in accordance with the following Expression. It is assumed that the correlation coefficient is calculated as "1", for example.

$$r_{q14q4} = \frac{S(q14q4)}{\sqrt{S(q14q14)S(q4q4)}}$$

A correlation coefficient between the temporal transition of a queue length of data addressed to the virtual machine VM5 serving as a transmission destination, the data being included in the input queue 21 of the virtual machine VM1, and the temporal transition of the queue length of the output queue 23 of the virtual machine VM5 is calculated in accordance with the following Expression. It is assumed that the correlation coefficient is calculated as "0.2", for example.

$$r_{q15q5} = \frac{S(q15q5)}{\sqrt{S(q15q15)S(q5q5)}}$$

A correlation coefficient between the temporal transition of a queue length of data addressed to the virtual machine VM6 serving as a transmission destination, the data being included in the input queue 21 of the virtual machine VM1, and the temporal transition of the queue length of the output queue 23 of the virtual machine VM6 is calculated in accordance with the following Expression. It is assumed that the correlation coefficient is calculated as "1", for example.

$$r_{q16q6} = \frac{S(q16q6)}{\sqrt{S(q16q16)S(q6q6)}}$$

A correlation coefficient between the temporal transition of a queue length of data addressed to the virtual machine VM4 serving as a transmission destination, the data being included in the input queue 21 of the virtual machine VM2, and the temporal transition of the queue length of the output queue 23 of the virtual machine VM4 is calculated in accordance with the following Expression. It is assumed that the correlation coefficient is calculated as "1", for example.

$$r_{q24q4} = \frac{S(q24q4)}{\sqrt{S(q24q24)S(q4q4)}}$$

A correlation coefficient between the temporal transition of a queue length of data addressed to the virtual machine VM5 serving as a transmission destination, the data being included in the input queue 21 of the virtual machine VM2, and the temporal transition of the queue length of the output queue 23 of the virtual machine VM5 is calculated in accordance with the following Expression. It is assumed that the correlation coefficient is calculated as "1", for example.

$$r_{q25q5} = \frac{S(q25q5)}{\sqrt{S(q25q25)S(q5q5)}}$$

A correlation coefficient between the temporal transition of a queue length of data addressed to the virtual machine VM6 serving as a transmission destination, the data being included in the input queue 21 of the virtual machine VM2, and the temporal transition of the queue length of the output queue 23 of the virtual machine VM6 is calculated in accordance with the following Expression. It is assumed that the correlation coefficient is calculated as "0.2", for example.

$$r_{q26q6} = \frac{S(q26q6)}{\sqrt{S(q26q26)S(q6q6)}}$$

A correlation coefficient between the temporal transition of a queue length of data addressed to the virtual machine VM4 serving as a transmission destination, the data being included in the input queue 21 of the virtual machine VM3, and the temporal transition of the queue length of the output queue 23 of the virtual machine VM4 is calculated in accordance with the following Expression. It is assumed that the correlation coefficient is calculated as "0.2", for example.

$$r_{q34q4} = \frac{S(q34q4)}{\sqrt{S(q34q34)S(q4q4)}}$$

A correlation coefficient between the temporal transition of a queue length of data addressed to the virtual machine VM5 serving as a transmission destination, the data being included in the input queue 21 of the virtual machine VM3, and the temporal transition of the queue length of the output queue 23 of the virtual machine VM5 is calculated in accordance with the following Expression. It is assumed that the correlation coefficient is calculated as "0.2", for example.

$$r_{q35q5} = \frac{S(q35q5)}{\sqrt{S(q35q35)S(q5q5)}}$$

A correlation coefficient between the temporal transition of a queue length of data addressed to the virtual machine VM6 serving as a transmission destination, the data being included in the input queue 21 of the virtual machine VM3, and the temporal transition of the queue length of the output queue 23 of the virtual machine VM6 is calculated in accordance with the following Expression. It is assumed that the correlation coefficient is calculated as "0.3", for example.

$$r_{q36q6} = \frac{S(q36q6)}{\sqrt{S(q36q36)S(q6q6)}}$$

Figure 19:
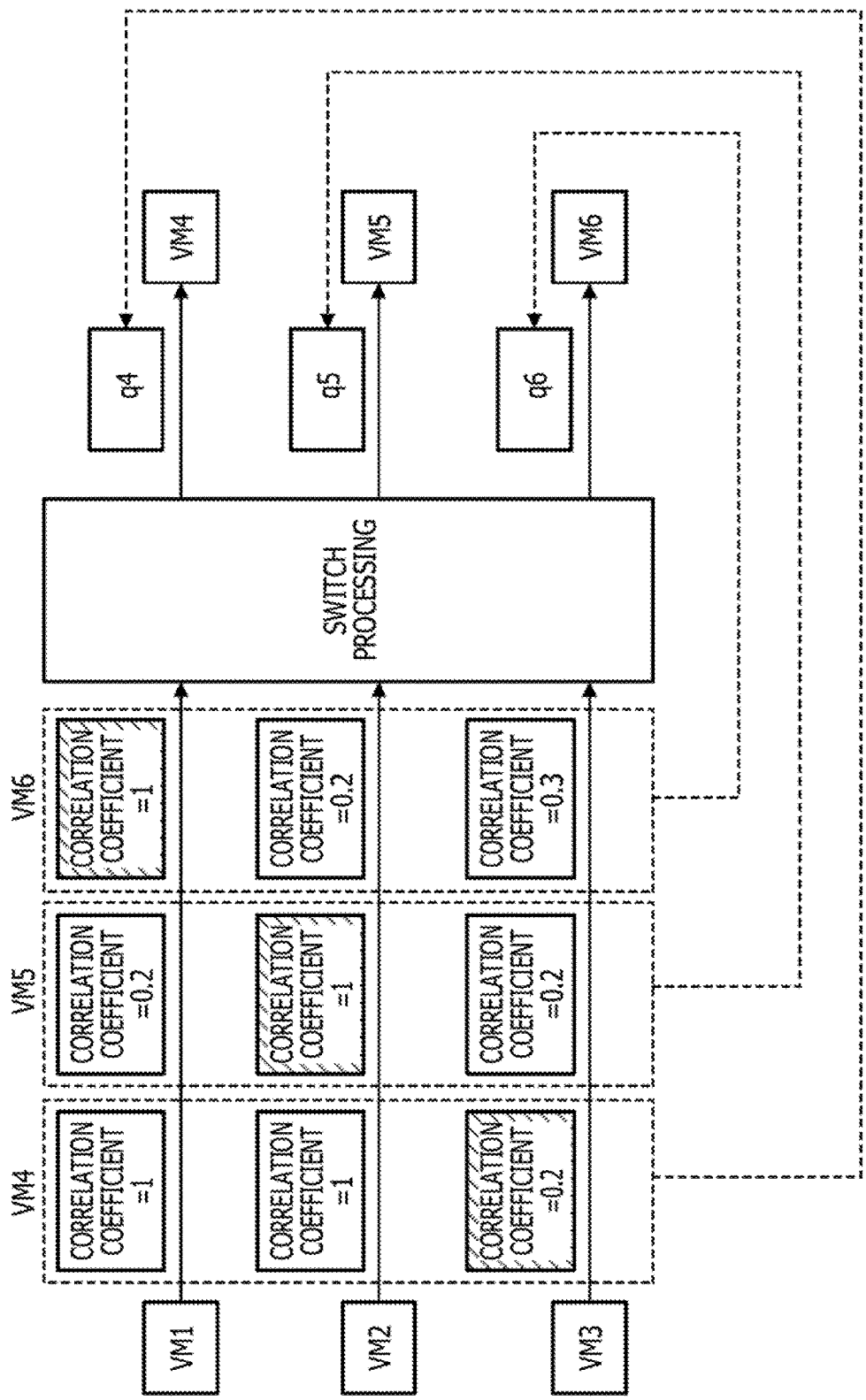
FIG. 19 is an explanatory diagram for explaining a correlation coefficient between a queue length of an input queue and a queue length of an output queue.

Individual correlation coefficients calculated as above are illustrated in FIG. 19. As illustrated in the above-mentioned FIG. 18 and FIG. 19, it is found that a pair of the virtual machine VM3 serving as a transmission source and the virtual machine VM4 serving as a transmission destination satisfies a condition that a queue length of data addressed to the corresponding one of the virtual machines serving as transmission destinations, the data being included in the corresponding one of the input queues 21, is greater than or equal to "100" and the corresponding one of the correlation coefficients is less than or equal to "0.7".

Next, in a given period of time, the mirroring determination unit 42 calculates increase rates of queue lengths of pieces of data addressed to the virtual machines serving as transmission destinations, the pieces of data being included in the input queues 21 of the virtual machines serving as transmission sources.

The mirroring determination unit 42 calculates increase rates of the respective queue lengths q14, q15, and q16 of pieces of data addressed to the virtual machines VM4, VM5, and VM6 serving as transmission destinations, the pieces of data being included in the input queue 21 of the virtual machine VM1, for example. In addition, the mirroring determination unit 42 calculates increase rates of the respective queue lengths q24, q25, and q26 of pieces of data addressed to the virtual machines VM4, VM5, and VM6 serving as transmission destinations, the pieces of data being included in the input queue 21 of the virtual machine VM2. In addition, the mirroring determination unit 42 calculates increase rates of the respective queue lengths q34, q35, and q36 of pieces of data addressed to the virtual machines VM4, VM5, and VM6 serving as transmission destinations, the pieces of data being included in the input queue 21 of the virtual machine VM3.

Figure 20:
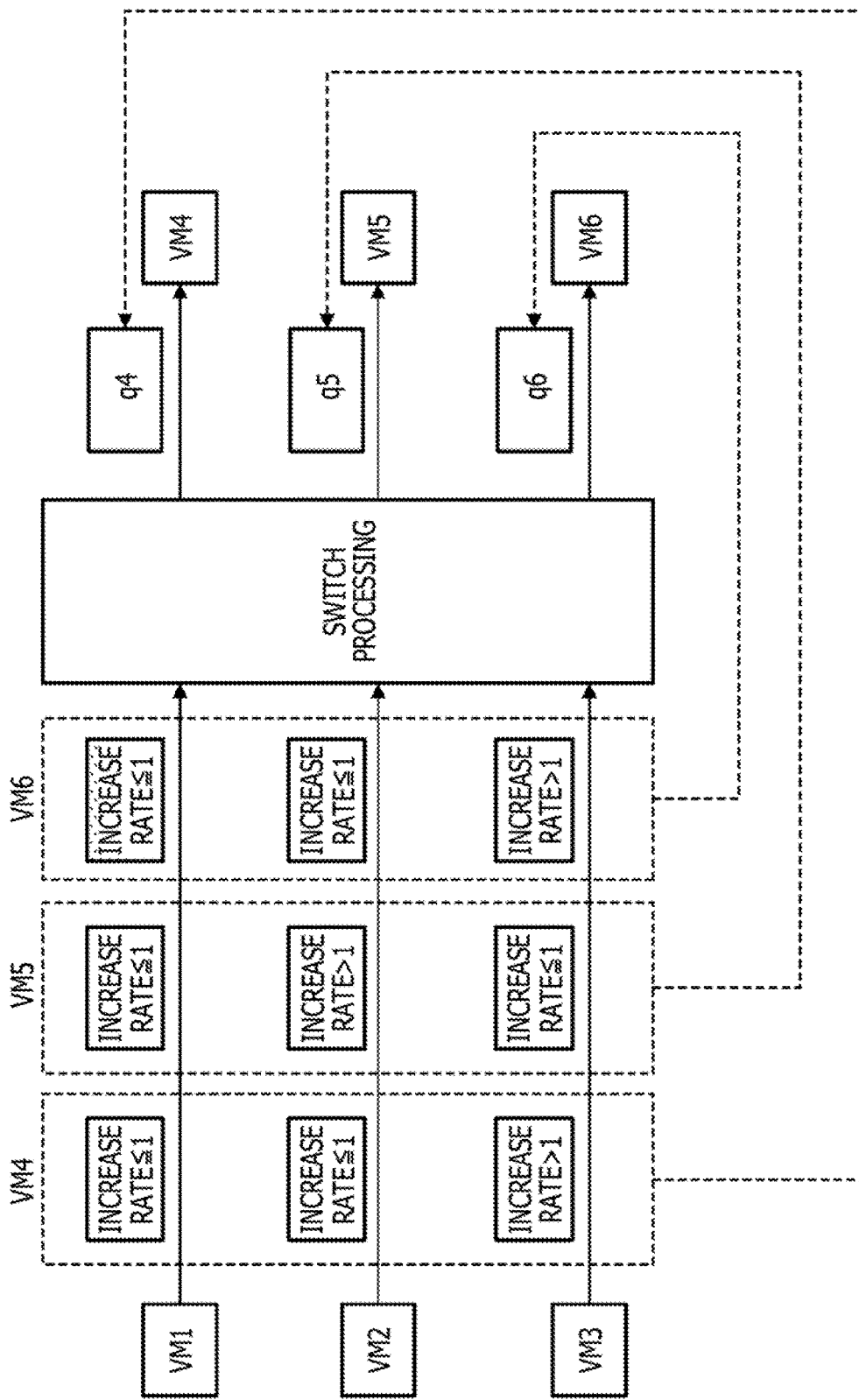
FIG. 20 is an explanatory diagram for explaining an increase rate of a queue length of an input queue.

Next, the mirroring determination unit 42 determines whether or not each of the calculated increase rates is less than or equal to "1". As illustrated in the above-mentioned FIG. 18, FIG. 19, and FIG. 20, it is found that a pair of the virtual machine VM1 serving as a transmission source and the virtual machine VM6 serving as a transmission destination satisfies a condition that a queue length of data addressed to the corresponding one of the virtual machines serving as transmission destinations is greater than or equal to "100", the corresponding one of the correlation coefficients is greater than "0.7", and the corresponding one of the increase rates is less than or equal to "1".

Next, the mirroring determination unit 42 identifies, as a mirroring target, a pair of the corresponding one of the virtual machines serving as transmission sources and the corresponding one of the virtual machines serving as transmission destinations, in which a queue length of data addressed to the corresponding one of the virtual machines serving as transmission destinations, the data being included in the input queue 21 of the corresponding one of the virtual machines serving as transmission sources, is greater than or equal to "100" and the corresponding one of the correlation coefficients is less than or equal to "0.7".

Figure 21:
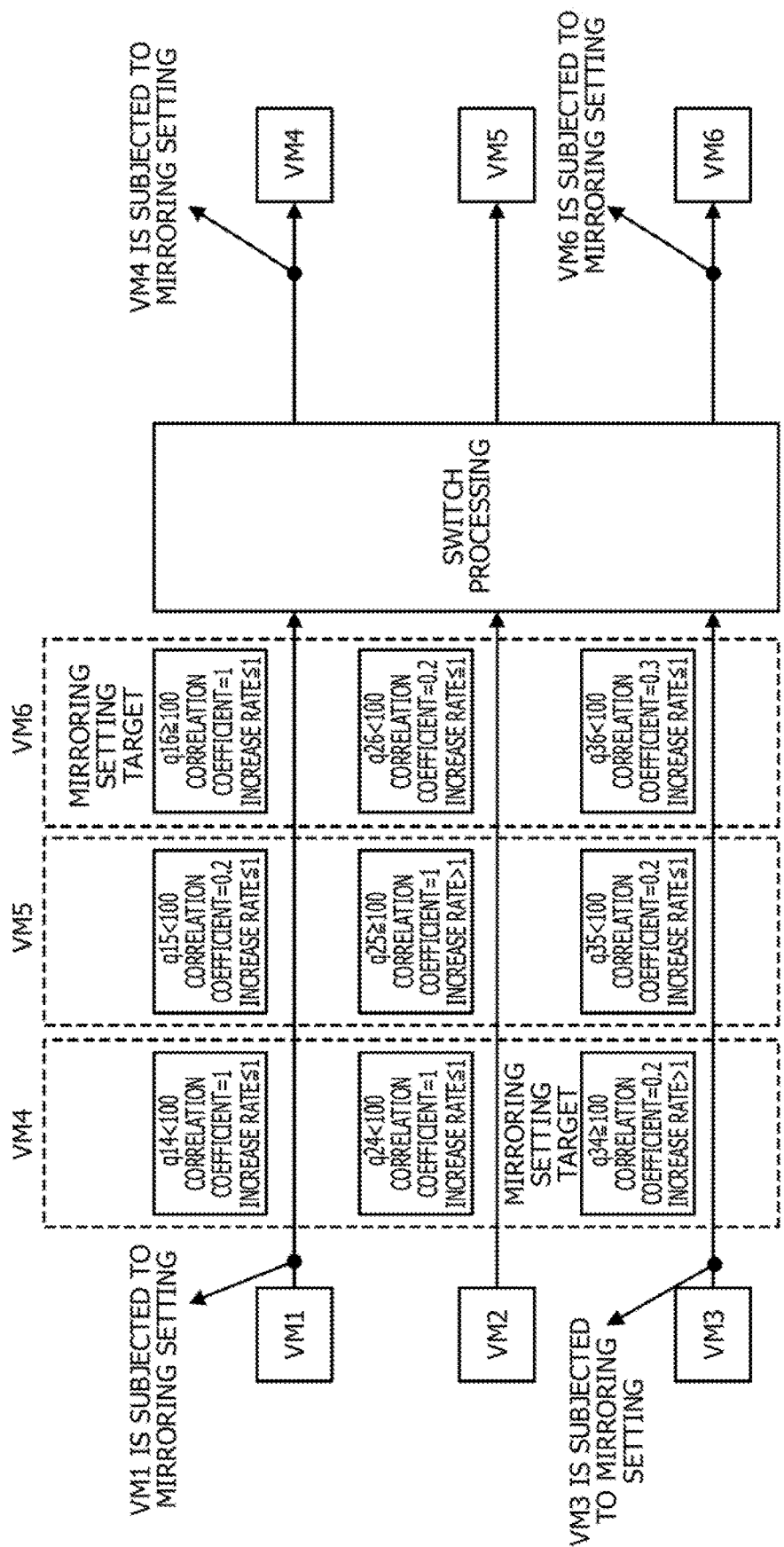
FIG. 21 is an explanatory diagram for explaining that mirroring is set based on a queue length, a correlation coefficient, and an increase rate of an input queue.

In FIG. 21, a pair of the corresponding one of the virtual machines serving as transmission sources and the corresponding one of the virtual machines serving as transmission destinations, in which a queue length of data addressed to the corresponding one of the virtual machines serving as transmission destinations, the data being included in the corresponding one of the input queues 21, is greater than or equal to "100" and the corresponding one of the correlation coefficients is less than or equal to "0.7", is a pair of the virtual machine VM3 and the virtual machine VM4. Therefore, the mirroring determination unit 42 identifies, as a mirroring target, the pair of the virtual machine VM3 and the virtual machine VM4.

The mirroring determination unit 42 identifies, as a mirroring target, a pair of the corresponding one of the virtual machines serving as transmission sources and the corresponding one of the virtual machines serving as transmission destinations, in which a queue length of data addressed to the corresponding one of the virtual machines serving as transmission destinations, the data being included in the corresponding one of the input queues 21, is greater than or equal to "100", the corresponding one of the correlation coefficients is greater than "0.7", and the corresponding one of the increase rates of the queue lengths is less than or equal to "1".

In FIG. 21, a pair of the corresponding one of the virtual machines serving as transmission sources and the corresponding one of the virtual machines serving as transmission destinations, in which a queue length of data addressed to the corresponding one of the virtual machines serving as transmission destinations, the data being included in the corresponding one of the input queues 21, is greater than or equal to "100", the corresponding one of the correlation coefficients is less than or equal to "0.7", and the corresponding one of the increase rates of the queue lengths is less than or equal to "1", is a pair of the virtual machine VM1 and the virtual machine VM6. Therefore, the mirroring determination unit 42 identifies, as a mirroring target, the pair of the virtual machine VM1 and the virtual machine VM6.

Note that while, in the above-mentioned description, a case where a correlation coefficient between queue lengths is obtained for each of pairs of the virtual machines serving as transmission sources and the virtual machines serving as transmission destinations and increase rates of queue lengths of pieces of data addressed to the virtual machines serving as transmission destinations are calculated is described as an example, an embodiment is not limited to this. As illustrated in, for example, the above-mentioned FIG. 19, correlation coefficients may be only obtained for pairs of virtual machines for each of which it is determined that a queue length of data addressed to the corresponding one of the virtual machines serving as transmission destinations, the data being included in the corresponding one of the input queues 21, is greater than the first threshold value (a shaded portion based on dots and shaded portions based on diagonal lines in FIG. 19). In addition, as illustrated in the above-mentioned FIG. 20, an increase rate of a queue length of the corresponding one of the virtual machines serving as transmission destinations may be only calculated for a pair of virtual machines, for which it is determined that a queue length of data addressed to the corresponding one of the virtual machines serving as transmission destinations and is greater than the first threshold value and for which it is determined that the corresponding one of the correlation coefficients is greater than the threshold value (a shaded portion based on dots in FIG. 20).

In addition, in accordance with a result of identification of mirroring targets, the mirroring determination unit 42 updates the mirroring setting table 56 in the information storage unit 40.

Based on pairs of virtual machines serving as transmission sources and virtual machines serving as transmission destinations, identified as mirroring targets by the mirroring determination unit 42, the mirroring setting unit 44 sets mirroring for the virtual machines serving as transmission sources and the virtual machines serving as transmission destinations.

Specifically, in a case where, in the mirroring setting table 56, for the corresponding one of the virtual machines serving as transmission sources, there is at least one virtual machine serving as a transmission destination for which communication is determined to be low in speed, a port from the relevant virtual machine serving as a transmission source to the virtual switch 16 is subjected to a mirroring setting. As illustrated in, for example, FIG. 21, a port from the virtual machine VM1 serving as a transmission source to the virtual switch 16 and a port from the virtual machine VM3 serving as a transmission source to the virtual switch 16 are subjected to mirroring settings.

In addition, in a case where, in the mirroring setting table 56, for the corresponding one of the virtual machines serving as transmission sources, there is at least one virtual machine serving as a transmission destination, determined to be low in speed, a port from the virtual switch 16 to the relevant virtual machine serving as a transmission destination is subjected to a mirroring setting. As illustrated in, for example, FIG. 21, a port from the virtual switch 16 to the virtual machine VM4 serving as a transmission destination and a port from the virtual switch 16 to the virtual machine VM6 serving as a transmission destination are subjected to mirroring settings.

In addition, the packet reception unit 48 receives packets transmitted and received by the ports of the virtual machine VM1, the virtual machine VM6, the virtual machine VM3, and the virtual machine VM4. Based on the packets received by the packet reception unit 48, the session management unit 50 analyzes communication between the virtual machines.

Figure 22:
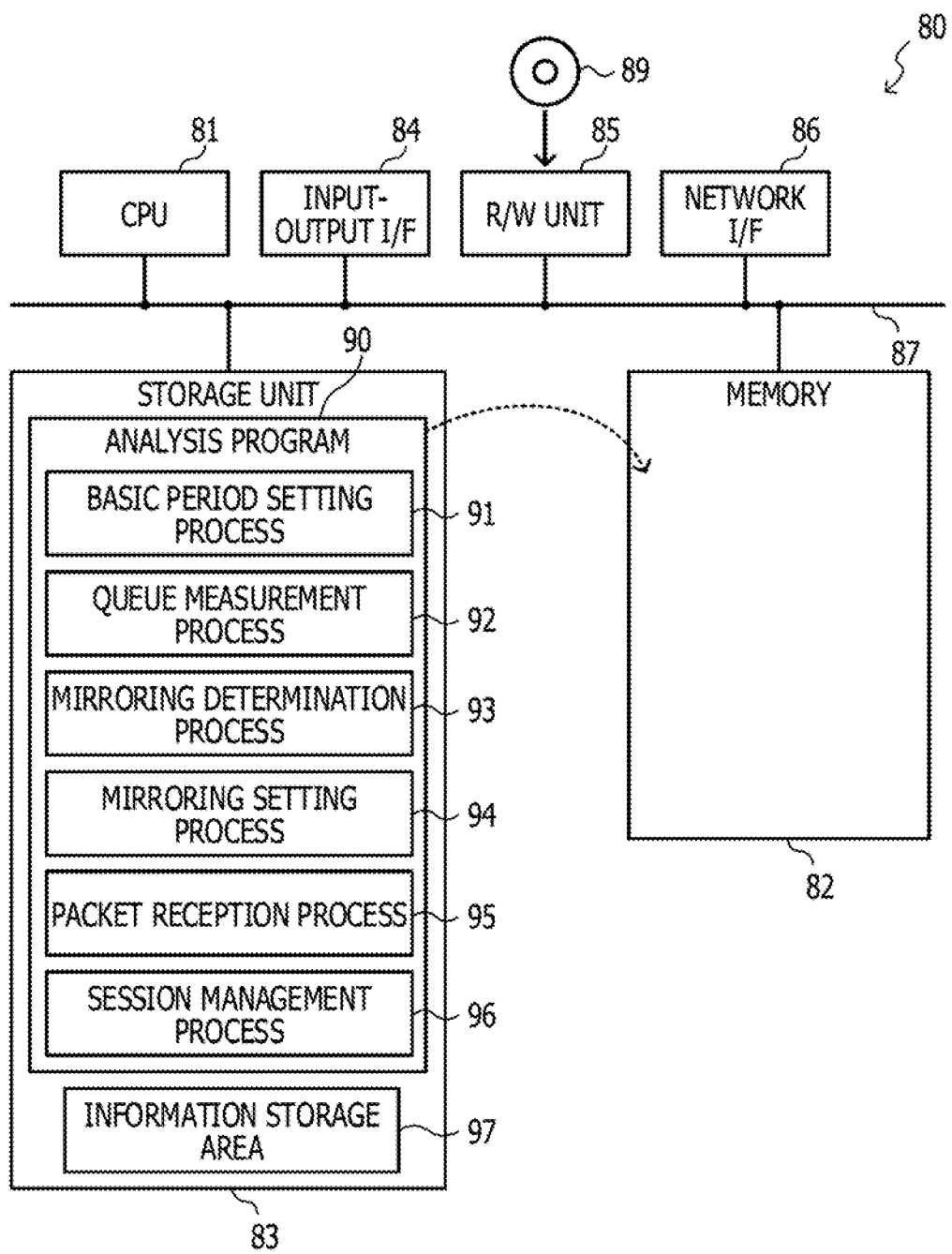
FIG. 22 is a block diagram illustrating a schematic configuration of a computer to function as the analysis apparatus.

The analysis apparatus 30 may be realized by, for example, a computer 80 illustrated in FIG. 22. The computer 80 includes a CPU 81, a memory 82 serving as a temporary storage area, and a non-volatile storage unit 83. In addition, the computer 80 includes an input-output I/F 84, a read/write (R/W) unit 85 to control writing and reading of data to and from a recording medium 89, and a network I/F 86 to be coupled to a network such as the Internet. The CPU 81, the memory 82, the storage unit 83, the input-output I/F 84, the R/W unit 85, and the network I/F 86 are coupled to one another via a bus 87.

The storage unit 83 may be realized by a hard disk drive (HDD), a solid state drive (SSD), a flash memory, or the like. In the storage unit 83 serving as a storage medium, an analysis program 90 for causing the computer 80 to function as the analysis apparatus 30 is stored. The analysis program 90 includes a basic period setting process 91, a queue measurement process 92, a mirroring determination process 93, a mirroring setting process 94, a packet reception process 95, and a session management process 96. In addition, the storage unit 83 includes an information storage area 97 in which pieces of information to configure individual pieces of information of the information storage unit 40 are stored.

The CPU 81 reads and deploys the analysis program 90 from the storage unit 83 and to the memory 82 and sequentially executes individual processes included in the analysis program 90. Note that, in the present embodiment, the CPU 81 is configured so as to include CPUs. The analysis apparatus 30 functions as a virtual machine. Therefore, a program of a virtual system (the illustration thereof is omitted) is read and deployed from the storage unit 83 and to the memory 82, thereby setting the virtual system. In addition, the analysis apparatus 30 is set as one virtual machine within the set virtual system.

The CPU 81 executes the basic period setting process 91, thereby operating as the basic period setting unit 36 illustrated in FIG. 12. In addition, the CPU 81 executes the queue measurement process 92, thereby operating as the queue measurement unit 38 illustrated in FIG. 12. In addition, the CPU 81 executes the mirroring determination process 93, thereby operating as the mirroring determination unit 42 illustrated in FIG. 12. In addition, the CPU 81 executes the mirroring setting process 94, thereby operating as the mirroring setting unit 44 illustrated in FIG. 12. In addition, the CPU 81 executes the packet reception process 95, thereby operating as the packet reception unit 48 illustrated in FIG. 12. In addition, the CPU 81 executes the session management process 96, thereby operating as the session management unit 50 illustrated in FIG. 12.

In this way, the computer 80 that executes the analysis program 90 turns out to function as the analysis apparatus 30.

Note that functions realized by the analysis program 90 may be realized by, for example, a semiconductor integrated circuit and may be realized, in more detail, by an application specific integrated circuit (ASIC) or the like.

Next, an operation of the analysis apparatus 30 according to the present embodiment will be described with reference to FIG. 23 to FIG. 33.

Figure 23:
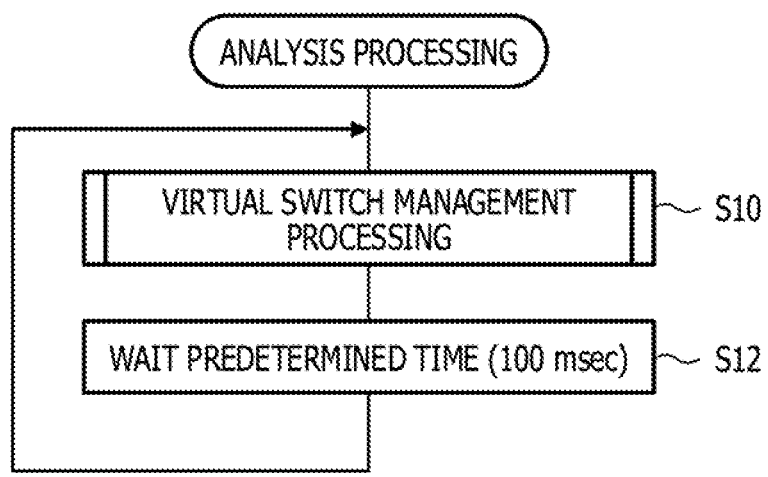
FIG. 23 is a flowchart illustrating an example of analysis processing.

FIG. 23 illustrates an example of a flow of analysis processing performed by the analysis apparatus 30.

The virtual system including virtual machines, a virtual switch, and a hypervisor is established by the computer 80, and an analysis processing routine illustrated in FIG. 23 is executed in a case where communication between the virtual machines is performed.

Analysis Processing Routine

In step S10, the virtual switch management function unit 32 identifies a pair of virtual machines serving as mirroring targets, within communication between virtual machines. In addition, based on the pair of virtual machines identified as mirroring targets, the virtual switch management function unit 32 performs mirroring on port communication of the virtual machines. Step S10 is realized by a virtual switch management processing routine illustrated in FIG. 24.

In step S12, the basic period setting unit 36 controls so that the queue measurement unit 38 and the mirroring determination unit 42 wait 100 msec.

The virtual switch management processing routine illustrated in FIG. 24 will be described.

In step S20, for each of the virtual machines serving as transmission sources, the queue measurement unit 38 measures queue lengths of pieces of data addressed to the respective virtual machines serving as transmission destinations, the pieces of data being included in the input queue 21 of the relevant virtual machine serving as a transmission source. In addition, for each of the virtual machines serving as transmission destinations, the queue measurement unit 38 measures the length of the output queue 23 of the relevant virtual machine serving as a transmission destination. Step S20 is realized by an input-output queue measurement processing routine illustrated in FIG. 25.

Figure 25:
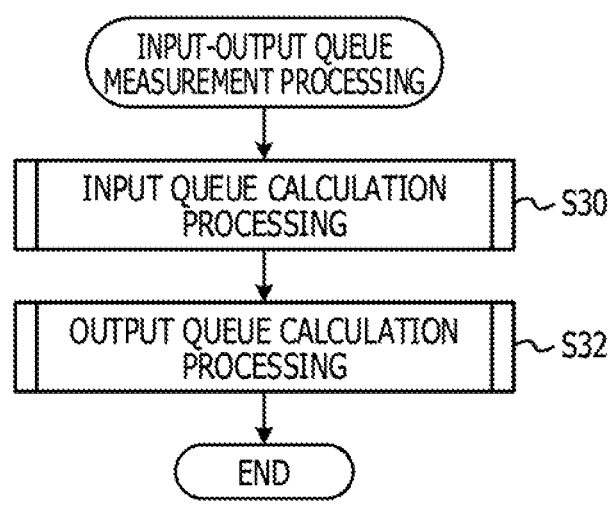
FIG. 25 is a flowchart illustrating an example of input-output queue measurement processing.

The input-output queue measurement processing routine illustrated in FIG. 25 will be described.

In step S30, for each of the virtual machines serving as transmission sources, the queue measurement unit 38 measures queue lengths of pieces of data addressed to the respective virtual machines serving as transmission destinations, the pieces of data being included in the input queue 21 of the relevant virtual machine serving as a transmission source. Step S30 is realized by an input queue calculation processing routine illustrated in FIG. 26.

In step S32, for each of the virtual machines serving as transmission destinations, the queue measurement unit 38 measures the length of the output queue 23 of the relevant virtual machine serving as a transmission destination and terminates the input-output queue measurement processing routine. Step S32 is realized by an output queue calculation processing routine illustrated in FIG. 27.

Figure 26:
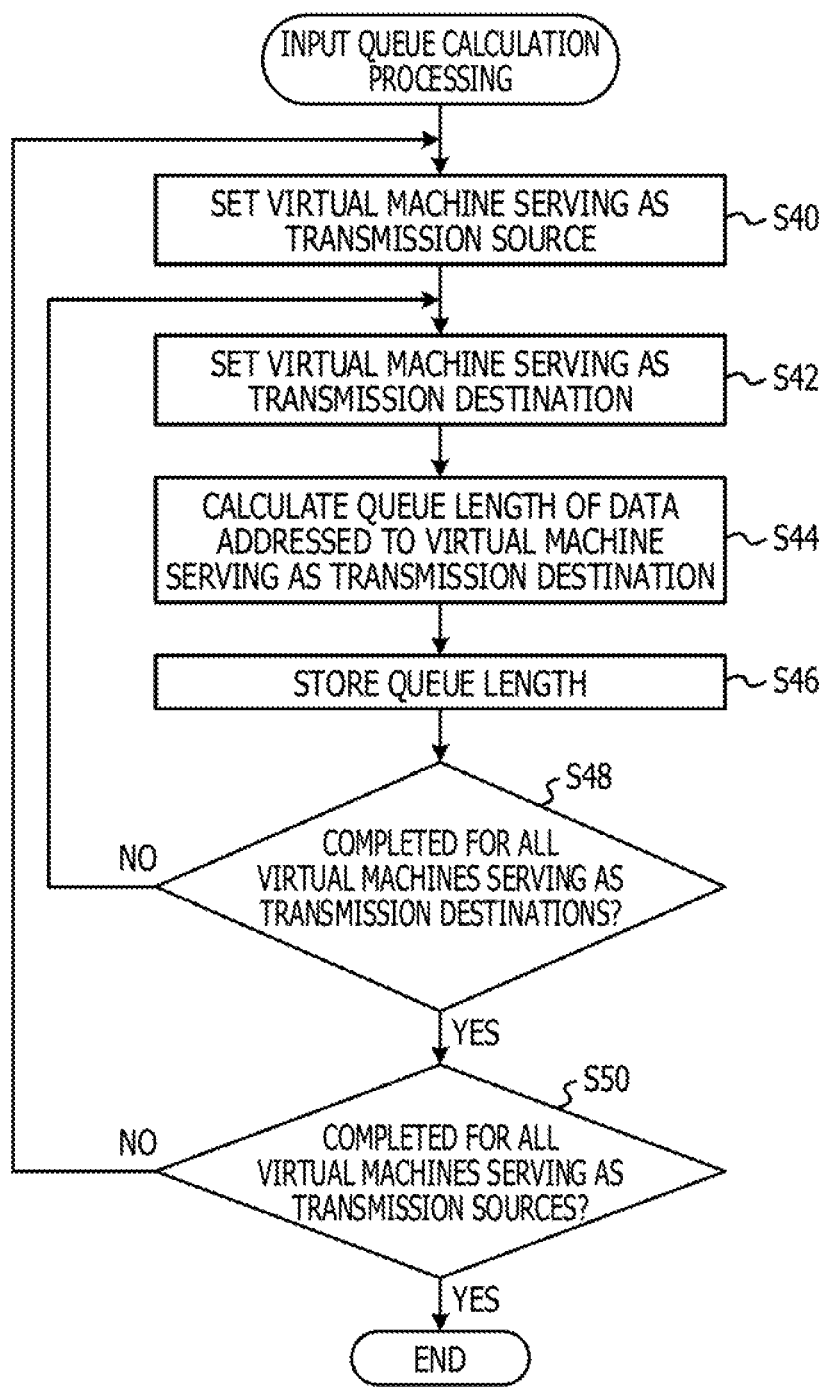
FIG. 26 is a flowchart illustrating an example of input queue calculation processing.

The input queue calculation processing routine illustrated in FIG. 26 will be described.

In step S40, the queue measurement unit 38 sets, as a processing target, one of the virtual machines serving as transmission sources.

In step S42, from among virtual machines serving as transmission destinations, pieces of data addressed to which are included in the input queue 21 of the virtual machine that serves as a transmission source and that is set in the above-mentioned step S40, the queue measurement unit 38 sets, as a processing target, one virtual machine serving as a transmission destination.

In step S44, in the input queue 21 of the virtual machine that serves as a transmission source and that is set in the above-mentioned step S40, the queue measurement unit 38 calculates a queue length of data addressed to the virtual machine that serves as a transmission destination and that is set in the above-mentioned step S42.

In step S46, the queue measurement unit 38 stores, in the input queue table 52 in the information storage unit 40, the queue length calculated in the above-mentioned step S44.

In step S48, the queue measurement unit 38 determines whether or not the processing operations in the above-mentioned step S42 to step S46 are each performed on all the virtual machines serving as transmission destinations, pieces of data addressed to which are included in the input queue 21 of the virtual machine that serves as a transmission source and that is set in the above-mentioned step S40. In a case where the processing operations in the above-mentioned step S42 to step S46 are each performed on all the virtual machines serving as transmission destinations, the processing proceeds to step S50. On the other hand, in a case where there is a virtual machine that serves as a transmission destination and on which the processing operations in the above-mentioned step S42 to step S46 are not performed, the processing returns to step S42.

In step S50, the queue measurement unit 38 determines whether or not the processing operations in the above-mentioned step S40 to step S48 are each performed on all the virtual machines serving as transmission sources. In a case where the processing operations in the above-mentioned step S40 to step S48 are each performed on all the virtual machines serving as transmission sources, the input queue calculation processing routine is terminated. On the other hand, in a case where there is a virtual machine that serves as a transmission source and on which the processing operations in the above-mentioned step S40 to step S48 are not performed, the processing returns to step S40.

Figure 27:
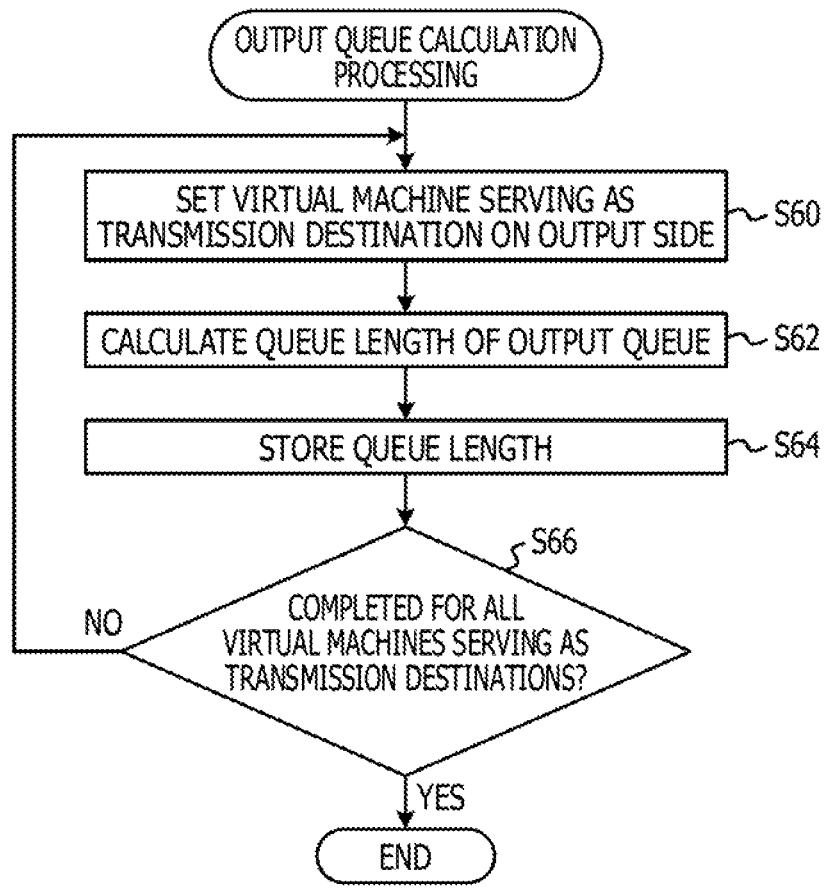
FIG. 27 is a flowchart illustrating an example of output queue calculation processing.

The output queue calculation processing routine illustrated in FIG. 27 will be described.

In step S60, the queue measurement unit 38 sets, as a processing target, one of the virtual machines serving as transmission destinations.

In step S62, the queue measurement unit 38 calculates the queue length of the output queue 23 of the virtual machine that serves as a transmission destination and that is set in the above-mentioned step S60.

In step S64, the queue measurement unit 38 stores, in the output queue table 54 in the information storage unit 40, the queue length calculated in the above-mentioned step S62.

In step S66, the queue measurement unit 38 determines whether or not the processing operations in the above-mentioned step S60 to step S64 are each performed on all the virtual machines serving as transmission destinations. In a case where the processing operations in the above-mentioned step S60 to step S64 are each performed on all the virtual machines serving as transmission destinations, the output queue calculation processing routine is terminated. On the other hand, in a case where there is a virtual machine serving as a transmission destination on which the processing operations in the above-mentioned step S60 to step S64 are not performed, the processing returns to step S60.

Figure 24:
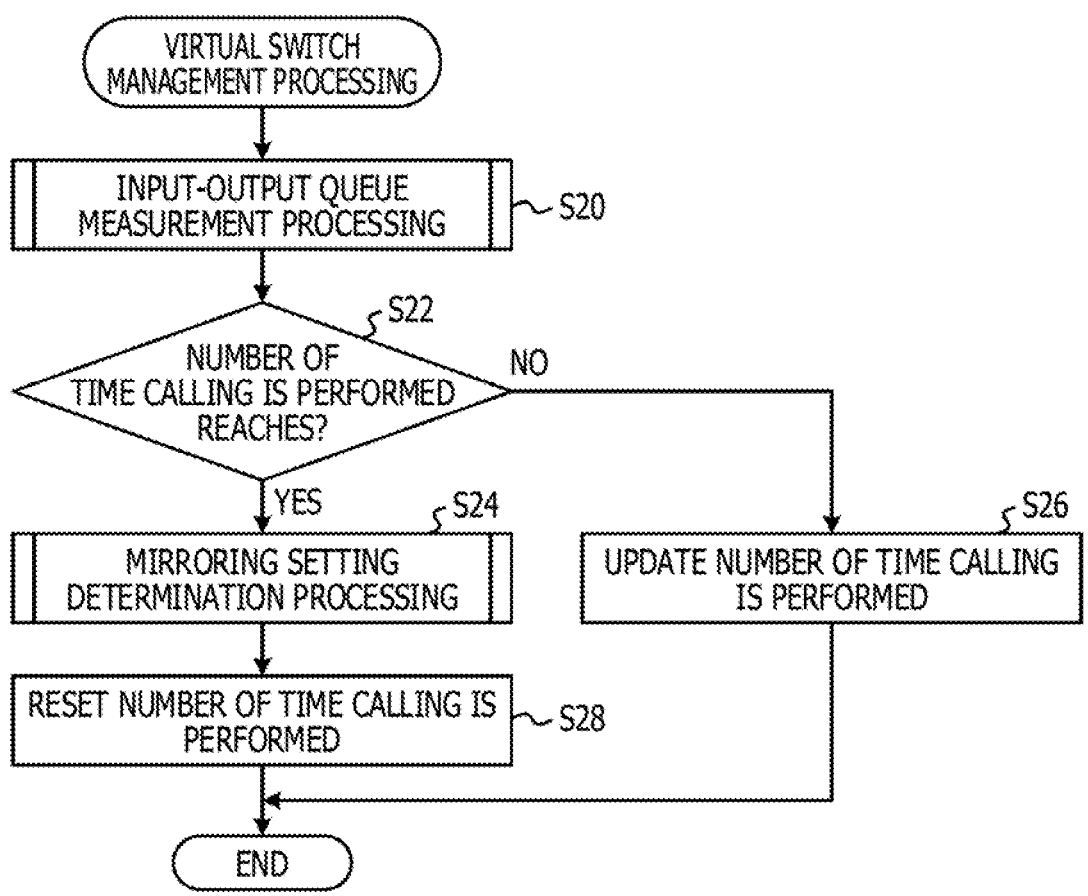
FIG. 24 is a flowchart illustrating an example of virtual switch management processing.

Next, returning to the virtual switch management processing routine illustrated in FIG. 24, in step S22, the basic period setting unit 36 determines whether or not the number of times the input-output queue measurement processing is called reaches the predetermined number of times. Since, in the present embodiment, the determination processing of a setting of mirroring is performed every 1000 msec, it is determined whether or not the number of time the calling is performed reaches 10 times. In a case where the number of time the calling is performed reaches 10 times, the processing proceeds to step S24. On the other hand, in a case where the number of time the calling is performed does not reach 10 times, the processing proceeds to step S26, and the basic period setting unit 36 updates the number of time the calling is performed and terminates the virtual switch management processing routine.

In step S24, the mirroring determination unit 42 reads, from the information storage unit 40, the temporal sequence of the input queue information and the temporal sequence of the output queue information and identifies a pair of virtual machines serving as mirroring targets. Step S24 is realized by a mirroring setting determination processing routine illustrated in FIG. 28.

In step S28, the basic period setting unit 36 resets the number of time the calling is performed, and terminates the virtual switch management processing routine.

The mirroring setting determination processing routine illustrated in FIG. 28 will be described.

In step S70, the mirroring determination unit 42 reads, from the information storage unit 40, the temporal sequence of the input queue information and the temporal sequence of the output queue information. In addition, based on the temporal sequence of the input queue information and the temporal sequence of the output queue information, the mirroring determination unit 42 identifies a pair of virtual machines, which serves as a mirroring target. Step S70 is realized by a queue-length correlation coefficient calculation processing routine illustrated in FIG. 29.

In step S72, based on the pair of the corresponding one of the virtual machines serving as transmission sources and the corresponding one of the virtual machines serving as transmission destinations, identified as a mirroring target in the above-mentioned step S70, the mirroring setting unit 44 sets mirroring for ports of the virtual machines. Step S72 is realized by a mirroring setting processing routine illustrated in FIG. 30.

In step S74, the L4 analysis function unit 46 performs mirroring on communication of the ports for which mirroring is set in the above-mentioned step S72.

The queue-length correlation coefficient calculation processing routine illustrated in FIG. 29 will be described.

In step S80, the mirroring determination unit 42 sets, as a processing target, one of the virtual machines serving as transmission sources.

In step S82, the mirroring determination unit 42 sets, as a processing target, one virtual machine that serves as a transmission destination and that is included in virtual machines serving as transmission destinations, pieces of data addressed to which are included in the input queue 21 of the virtual machine that serves as a transmission source and that is set in the above-mentioned step S80.

In step S84, the mirroring determination unit 42 reads, from the input queue table 52, a queue length of data addressed to the virtual machine that serves as a transmission destination and that is set in the above-mentioned step S82, the data being included in the input queue 21 of the virtual machine that serves as a transmission source and that is set in the above-mentioned step S80.

In step S86, the mirroring determination unit 42 reads, from the output queue table 54, the queue length of the output queue 23 of the virtual machine that serves as a transmission destination and that is set in the above-mentioned step S82.

In step S88, the mirroring determination unit 42 determines whether or not the input queue information and the output queue information that correspond to a determination period (here, 1000 msec), in other words, the input queue information and the output queue information that correspond to previous n times (here, corresponding to 10 times) are read. In a case where the input queue information and the output queue information that correspond to 1000 msec are read, the processing proceeds to step S90. On the other hand, in a case where the input queue information and the output queue information that correspond to 1000 msec are not read, the processing returns to step S84.

In step S90, based on the latest queue length read in the above-mentioned step S84, the mirroring determination unit 42 determines whether or not a queue length of data addressed to the virtual machine that serves as a transmission destination and that is set in the above-mentioned step S82 is greater than or equal to the first threshold value (here, "100"). In a case where the queue length is greater than or equal to "100", the processing proceeds to step S92. On the other hand, in a case where the queue length is less than "100", the processing proceeds to step S94.

In step S92, based on the temporal sequences of the input queue information and the output queue information, the mirroring determination unit 42 obtains a correlation coefficient in accordance with the above-mentioned Expression (1). Step S92 is realized by a correlation coefficient calculation processing routine illustrated in FIG. 31.

Figure 31:
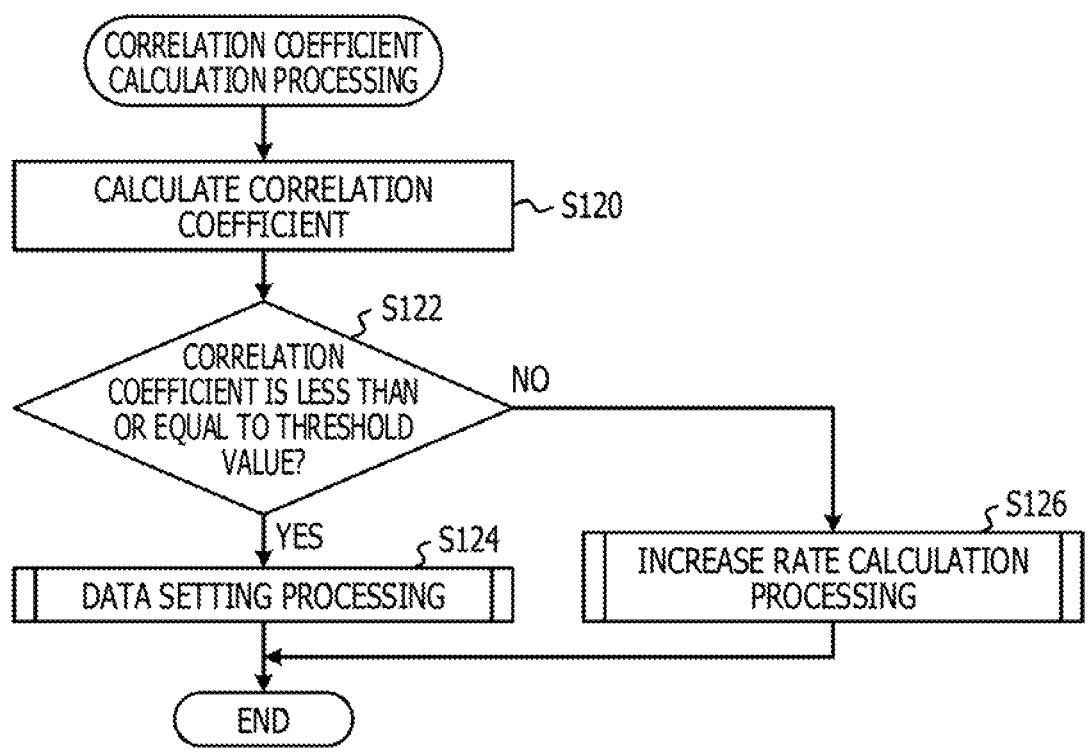
FIG. 31 is a flowchart illustrating an example of correlation coefficient calculation processing.

The correlation coefficient calculation processing routine illustrated in FIG. 31 will be described.

In step S120, based on the temporal sequences of the input queue information and the output queue information, the mirroring determination unit 42 obtains a correlation coefficient in accordance with the above-mentioned Expression (1).

In step S122, the mirroring determination unit 42 determines whether or not the correlation coefficient obtained in the above-mentioned step S120 is less than or equal to the second threshold value (here, "0.7"). In a case where the correlation coefficient is less than or equal to "0.7", the processing proceeds to step S124. On the other hand, in a case where the correlation coefficient is greater than "0.7", the processing proceeds to step S126.

In step S124, the mirroring determination unit 42 updates the mirroring setting table 56 stored in the information storage unit 40. Step S124 is realized by a data setting processing routine illustrated in FIG. 32.

Figure 32:
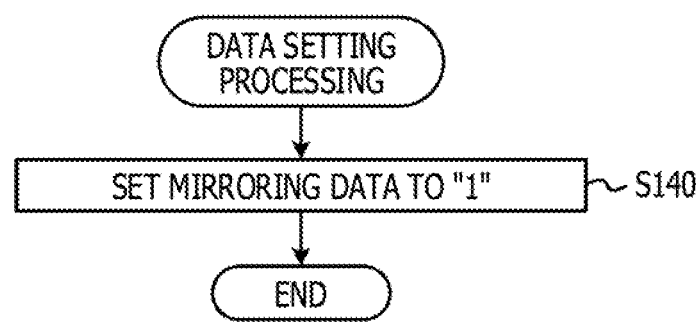
FIG. 32 is a flowchart illustrating an example of data setting processing.

The data setting processing routine illustrated in FIG. 32 will be described.

In step S140, for the mirroring setting table 56, the mirroring determination unit 42 updates, to "1", an item corresponding to the pair of the virtual machine that serves as a transmission source and that is set in the above-mentioned step S80 and the virtual machine that serves as a transmission destination and that is set in the above-mentioned step S82. In addition, the mirroring determination unit 42 terminates data setting processing routine.

Next, returning to the correlation coefficient calculation processing routine, in step S126, in a given period of time, the mirroring determination unit 42 calculates an increase rate of a queue length of data addressed to the corresponding one of the virtual machines serving as transmission destinations, the data being included in the input queue 21 of the corresponding one of the virtual machines serving as transmission sources. Step S126 is realized by an increase rate calculation processing routine illustrated in FIG. 33.

Figure 33:
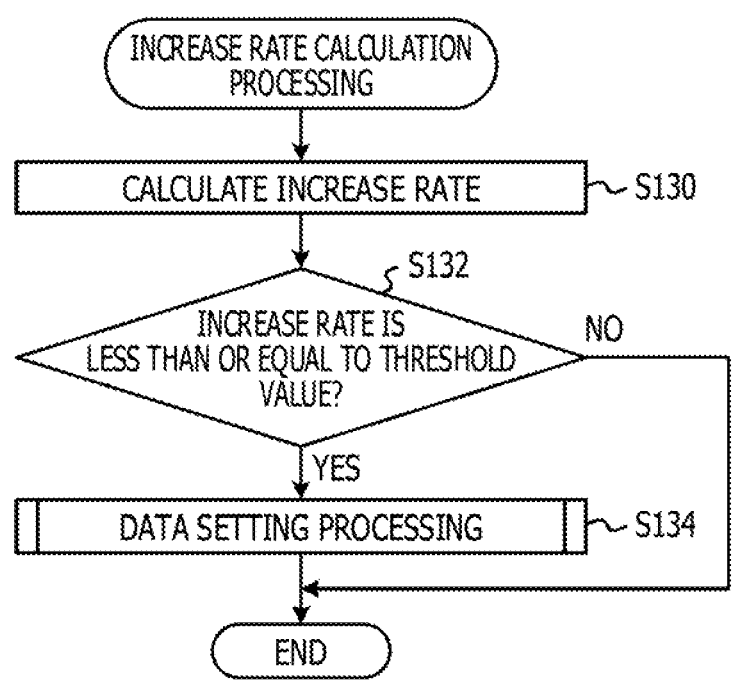
FIG. 33 is a flowchart illustrating an example of increase rate calculation processing.

The increase rate calculation processing routine illustrated in FIG. 33 will be described.

In step S130, in a given period of time, the mirroring determination unit 42 calculates an increase rate of a queue length of data addressed to the virtual machine that serves as a transmission destination and that is set in the above-mentioned step S82, the data being included in the input queue 21 of the virtual machine that serves as a transmission source and that is set in the above-mentioned step S80.

In step S132, the mirroring determination unit 42 determines whether or not the increase rate calculated in the above-mentioned step S130 is less than or equal to "1". In a case where the corresponding increase rate is less than or equal to "1", the processing proceeds to step S134. On the other hand, in a case where the corresponding increase rate is greater than "1", the increase rate calculation processing routine is terminated.

In step S134, the mirroring determination unit 42 updates the mirroring setting table 56 stored in the information storage unit 40. Step S124 is realized by the data setting processing routine illustrated in FIG. 32.

Figure 29:
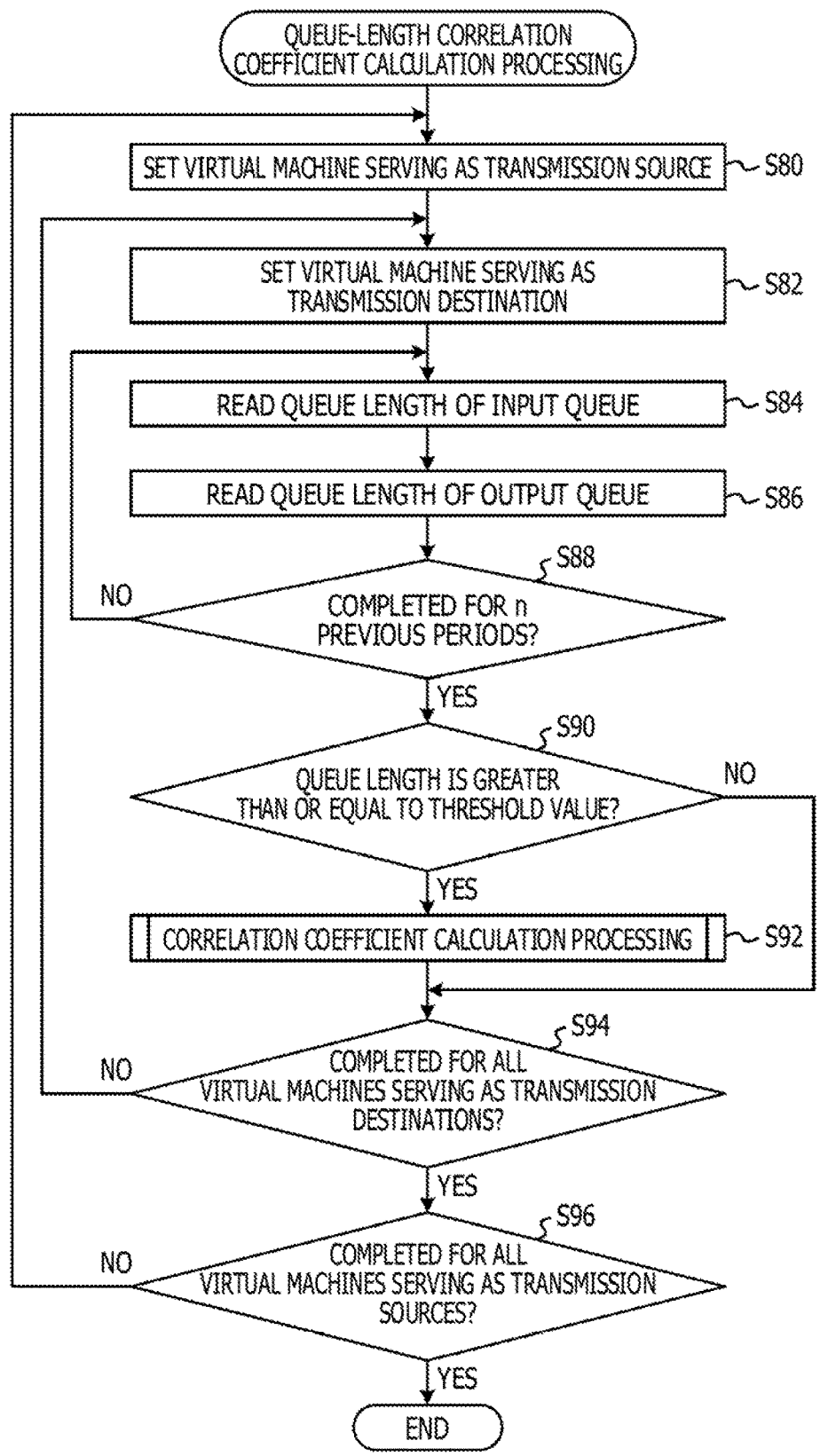
FIG. 29 is a flowchart illustrating an example of queue-length correlation coefficient calculation processing.

Next, returning to the queue-length correlation coefficient calculation processing routine illustrated in FIG. 29, in step S94, the mirroring determination unit 42 determines whether or not the processing operations in the above-mentioned step S82 to step S92 are each performed on all the virtual machines serving as transmission destinations. In a case where the processing operations in the above-mentioned step S82 to step S92 are each performed on all the virtual machines serving as transmission destinations, the processing proceeds to step S96. On the other hand, in a case where there is a virtual machine that serves as a transmission destination and on which the processing operations in the above-mentioned step S82 to step S92 are not performed, the processing returns to step S82.

In step S96, the mirroring determination unit 42 determines whether or not the processing operations in the above-mentioned step S80 to step S94 are each performed on all the virtual machines serving as transmission sources. In a case where the processing operations in the above-mentioned step S80 to step S94 are each performed on all the virtual machines serving as transmission sources, the queue-length correlation coefficient calculation processing routine is terminated. On the other hand, in a case where there is a virtual machine that serves as a transmission source and on which the processing operations in the above-mentioned step S80 to step S94 are not performed, the processing returns to step S80.

Figure 28:
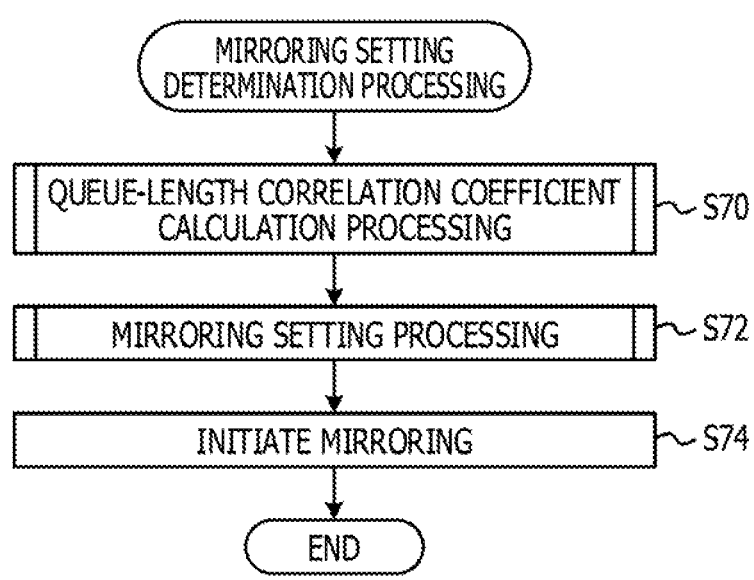
FIG. 28 is a flowchart illustrating an example of mirroring setting determination processing.

Next, returning to the mirroring setting determination processing routine illustrated in FIG. 28, in step S72, based on pairs of virtual machines serving as transmission sources and virtual machines serving as transmission destinations, identified as mirroring targets, the mirroring setting unit 44 sets mirroring for ports of the virtual machines.

Figure 30:
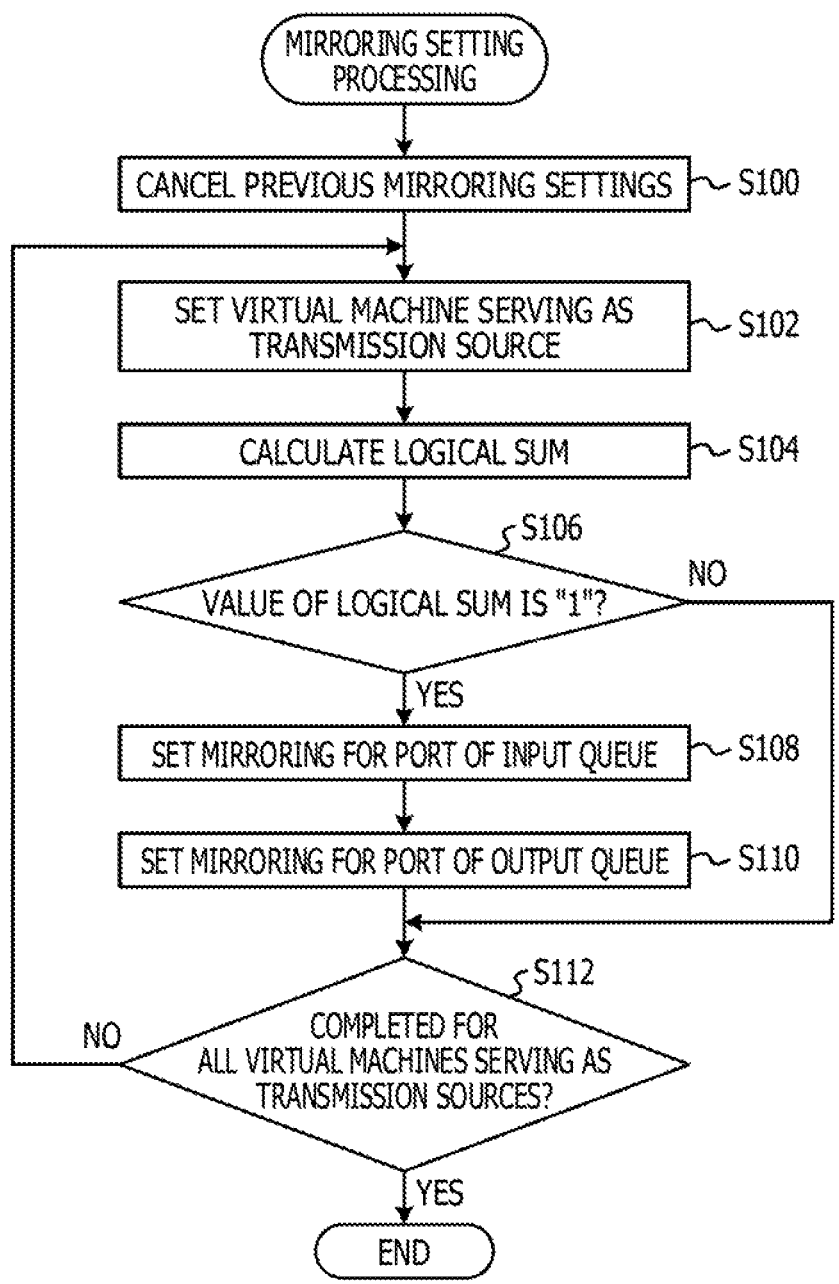
FIG. 30 is a flowchart illustrating an example of mirroring setting processing.

The mirroring setting processing routine illustrated in FIG. 30 will be described.

In step S100, the mirroring setting unit 44 cancels mirroring settings of ports of virtual machines for which mirroring is set in the previous processing.

In step S102, the mirroring setting unit 44 sets, as a processing target, one of the virtual machines serving as transmission sources.

In step S104, based on the mirroring setting table 56, the mirroring setting unit 44 calculates a logical sum of values of items of virtual machines serving as transmission destinations, which corresponds to the virtual machine that serves as a transmission source and that is set in the above-mentioned step S102. Specifically, by using values of "1" or "0" stored in the items of respective virtual machines that serve as transmission destinations and that correspond to the virtual machine that serves as a transmission source and that is set in the above-mentioned step S102, a logical sum of values of items corresponding to respective virtual machines serving as transmission destinations is calculated.

In step S106, it is determined whether or not a value of the logical sum calculated in the above-mentioned step S104 is "1". In a case where the value of the logical sum is "1", the processing proceeds to step S108. On the other hand, in a case where the value of the logical sum is not "1", the processing proceeds to step S112.

In step S108, the mirroring setting unit 44 sets mirroring for a port of the virtual machine that serves as a transmission source and that is set in the above-mentioned step S102.

In step S110, the mirroring setting unit 44 sets mirroring for a port of the virtual machine that serves as a transmission destination and for which a value of an item in the mirroring setting table 56 is "1", the item being included in items of the virtual machines that serve as transmission destinations and that correspond to the virtual machine that serve as a transmission source and that is set in step S102.

In step S112, the mirroring setting unit 44 determines whether or not the processing operations in the above-mentioned step S102 to step S110 are each performed on all the virtual machines serving as transmission sources. In a case where the processing operations in the above-mentioned step S102 to step S110 are each performed on all the virtual machines serving as transmission sources, the mirroring setting processing routine is terminated. On the other hand, in a case where there is a virtual machine that serves as a transmission source and on which the processing operations in the above-mentioned step S102 to step S110 are not performed, the processing returns to step S102.

As described above, the analysis apparatus 30 of the present embodiment obtains correlation coefficients between the temporal transitions of queue lengths of pieces of data addressed to the respective virtual machines serving as transmission destinations, the pieces of data being included in the corresponding one of the input queues 21, and the temporal transitions of the queue lengths of the output queues 23 of the respective virtual machines serving as transmission destinations. In addition, from among pairs of virtual machines serving as transmission sources and virtual machines serving as transmission destinations, which each have a correlation coefficient greater than the second threshold value, the analysis apparatus 30 identifies, as a mirroring target, a pair of the corresponding one of the virtual machines serving as transmission sources and the corresponding one of the virtual machines serving as transmission destinations, for which the increase rate of a queue length of data addressed to the relevant virtual machine serving as a transmission destination is less than or equal to the third threshold value. In addition, the analysis apparatus 30 identifies, as a mirroring target, a pair of the corresponding one of the virtual machines serving as transmission sources and the corresponding one of the virtual machines serving as transmission destinations, for which a correlation coefficient is less than or equal to the second threshold value. From this, it is possible to identify, as a mirroring target, a pair of the corresponding one of the virtual machines serving as transmission sources and the corresponding one of the virtual machines serving as transmission destinations, for which a communication speed between virtual machines is low in speed.

In addition, in the analysis apparatus 30 of the present embodiment, low-speed communication between virtual machine is discriminated. Therefore, it is possible to determine whether being communication between CPU cores within the same socket or communication between CPU cores between different sockets. In addition, in a case where low-speed communication between virtual machines increases or decreases in number, it becomes possible to dynamically set mirroring. In addition, it is possible to identify communication between virtual machines in which congestion is likely to occur.

Next, an example of a modification to an embodiment will be described.

While, in an embodiment, a case where the analysis apparatus 30 is realized as one virtual machine within the virtual system set by the computer 80 is described, an embodiment is not limited to this. The analysis apparatus 30 may be realized by, for example, 1 computer, and the analysis apparatus 30 may analyze communication between virtual machines within a virtual system realized by another computer.

In addition, while, in an embodiment, a case where mirroring is set for ports of a pair of a virtual machine serving as a transmission source and another virtual machine serving as a transmission destination, identified as a mirroring target, is described as an example, an embodiment is not limited to this. Mirroring may be set for a port of at least one virtual machine of a pair of a virtual machine serving as a transmission source and another virtual machine serving as a transmission destination, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for analyzing a quality of a communication via a virtual switch between virtual machines coupled by the virtual switch, the method comprising:
   executing, by a computer, a first process that includes obtaining input queue information and output queue information, the input queue information indicating, in a temporal sequence, a first queue length corresponding to a number of pieces of data in an input queue of the virtual switch, the input queue being associated with a transmission source of the communication, the output queue information indicating, in the temporal sequence, a second queue length corresponding to a number of pieces of data in an output queue in the virtual switch, the output queue being associated with a transmission destination of the communication; and
   executing a second process that includes determining whether the first queue length indicated by the input queue information is greater than a first threshold;
   executing a third process when the first queue length is greater than the first threshold, the third process being configured to determine whether a first correlation value is greater than a second threshold, the correlation value being obtained by calculating a correlation value between a first temporal transition of the first queue length and a second temporal transition of the second queue length based on the input queue information and the output queue information in a time period between a first time point and a second time point;
   executing a fourth process when the first correlation value is greater than the second threshold, the fourth process being configured to determine whether a first increase rate is less than a third threshold, the first increase rate being obtained by calculating an increase rate of the first queue length based on the input queue information in the time period between the first time point and the second time point; and
   executing a fifth process when the first increase rate is less than the third threshold, the fifth process being configured to perform mirroring on a pair of the transmission source and the transmission destination of the communication.

2. The method according to claim 1, further comprising:
   obtaining, by the computer, for each of pairs of the transmission sources and the transmission destinations, a value of a correlation between a temporal transition of the first queue length of data addressed to the first destination among the transmission destinations, the first queue length being indicated by the input queue information of the first source among the transmission sources, and a temporal transition of the second queue length of the output queue information in a case where the second queue length of data addressed to the first destination is greater than or equal to the first threshold value;
   calculating, by the computer, an increase rate of the first queue length of the input queue information in a case where the value of a correlation is greater than the second threshold value; and
   identifying, by the computer, a third pair and a fourth pair as mirroring targets,
   wherein the third pair is a pair of a third source among the transmission sources and a third destination among the transmission destinations, in which the first queue length of the input queue information is greater than or equal to the first threshold value, the value of a correlation is greater than the second threshold value, and an increase rate of the first queue length of the input queue information is less than or equal to the third threshold value, and
   wherein the fourth pair is a pair of a fourth source among the transmission sources and a fourth destination among the transmission destinations, in which the first queue length of the input queue information is greater than or equal to the first threshold value, and the value of a correlation is less than or equal to the second threshold value.

3. The method according to claim 1, further comprising:
   executing, by the computer, processing for mirroring of communication, on at least one of the first pair and the second pair, the one of the first pair and the second pair being identified as a mirroring target.

4. The method according to claim 1, further comprising:
   obtaining, by the computer, a correlation coefficient between a temporal transition of the first queue length and a temporal transition of the second queue length of the output queue information, wherein the first queue length being the latest value included in the temporal sequence of the input queue information is greater than or equal to the first threshold value.

5. An apparatus for analyzing a quality of a communication via a virtual switch between virtual machines coupled by the virtual switch, the apparatus comprising:
   a memory configured to store input queue information and output queue information, the input queue information indicating, in a temporal sequence, a first queue length corresponding to a number of pieces of data in an input queue of the virtual switch, the input queue being associated with a transmission source of the communication, the output queue information indicating, in the temporal sequence, a second queue length corresponding to a number of pieces of data in an output queue in the virtual switch, the output queue being associated with a transmission destination of the communication;

a processor coupled to the memory and configured to execute a first process that includes obtaining the input queue information and the output queue information from the memory; and execute a second process that includes determining whether the first queue length indicated by the input queue information is greater than a first threshold, executing a third process when the first queue length is greater than the first threshold, the third process being configured to determine whether a first correlation value is greater than a second threshold, the correlation value being obtained by calculating a correlation value between a first temporal transition of the first queue length and a second temporal transition of the second queue length based on the input queue information and the output queue information in a time period between a first time point and a second time point;

executing a fourth process when the first correlation value is greater than the second threshold, the fourth process being configured to determine whether a first increase rate is less than a third threshold, the first increase rate being obtained by calculating an increase rate of the first queue length based on the input queue information in the time period between the first time point and the second time point; and executing a fifth process when the first increase rate is less than the third threshold, the fifth process being configured to perform mirroring on a pair of the transmission source and the transmission destination of the communication.

6. The apparatus according to claim 5, wherein the processor is configured to execute a sixth process that includes obtaining, for each of pairs of the transmission sources and the transmission destinations, a value of a correlation between a temporal transition of the first queue length of data addressed to the first destination among the transmission destinations, the first queue length being indicated by the input queue information of the first source among the transmission sources, and a temporal transition of the second queue length of the output queue information in a case where the second queue length of data addressed to the first destination is greater than or equal to the first threshold value;

execute a seventh process that includes calculating an increase rate of the first queue length of the input queue information in a case where the value of a correlation is greater than the second threshold value; and execute a eighth process that includes identifying a third pair and a fourth pair as mirroring targets, wherein the third pair is a pair of a third source among the transmission sources and a third destination among the transmission destinations, in which the first queue length of the input queue information is greater than or equal to the first threshold value, the value of a correlation is greater than the second threshold value, and an increase rate of the first queue length of the input queue information is less than or equal to the third threshold value, and wherein the fourth pair is a pair of a fourth source among the transmission sources and a fourth destination among the transmission destinations, in which the first queue length of the input queue information is greater than or equal to the first threshold value, and the value of a correlation is less than or equal to the second threshold value.

7. The apparatus according to claim 5, wherein the processor is configure to execute a ninth process that includes mirroring of communication, on at least one of the first pair and the second pair, the one of the first pair and the second pair being identified as a mirroring target.

8. The apparatus according to claim 5, wherein the processor is configured to execute a tenth process that includes obtaining a correlation coefficient between a temporal transition of the first queue length and a temporal transition of the second queue length of the output queue information, wherein the first queue length being the latest value included in the temporal sequence of the input queue information is greater than or equal to the first threshold value.

9. A non-transitory computer-readable medium storing computer-executable program that causes a processor to execute a process for analyzing a quality of a communication via a virtual switch between virtual machines coupled by the virtual switch, the process comprising:

executing a first process that includes obtaining input queue information and output queue information from a memory configured to store the input queue information and the output queue information, the input queue information indicating, in a temporal sequence, first queue length corresponding to a number of pieces of data in an input queue of the virtual switch, the input queue being associated with a transmission source of the communication, the output queue information indicating, in the temporal sequence, a second queue length corresponding to a number of pieces of data in an output queue in the virtual switch, the output queue being associated with a transmission destination of the communication; and executing a second process that includes determining whether the first queue length indicated by the input queue information is greater than a first threshold;

executing a third process when the first queue length is greater than the first threshold, the third process being configured to determine whether a first correlation value is greater than a second threshold, the correlation value being obtained by calculating a correlation value between a first temporal transition of the first queue length and a second temporal transition of the second queue length based on the input queue information and the output queue information in a time period between a first time point and a second time point;

executing a fourth process when the first correlation value is greater than the second threshold, the fourth process being configured to determine whether a first increase rate is less than a third threshold, the first increase rate being obtained by calculating an increase rate of the first queue length based on the input queue information in the time period between the first time point and the second time point; and executing a fifth process when the first increase rate is less than the third threshold, the fifth process being configured to perform mirroring on a pair of the transmission source and the transmission destination of the communication.

10. The non-transitory computer-readable medium according to claim 9, wherein the process further includes executing a sixth process that includes obtaining, for each of pairs of the transmission sources and the transmission destinations, a value of a correlation between a temporal transition of the first queue length of data addressed to the first destination among the transmission destinations, the first queue length being indicated by the input queue information of the first source among the transmission sources, and a temporal transition of the second queue length of the output queue information in a case where the second queue length of data addressed to the first destination is greater than or equal to the first threshold value;

executing a seventh process that includes calculating an increase rate of the first queue length of the input queue information in a case where the value of a correlation is greater than the second threshold value; and executing a eighth process that includes identifying a third pair and a fourth pair as mirroring targets, wherein the third pair is a pair of a third source among the transmission sources and a third destination among the transmission destinations, in which the first queue length of the input queue information is greater than or equal to the first threshold value, the value of a correlation is greater than the second threshold value, and an increase rate of the first queue length of the input queue information is less than or equal to the third threshold value, and wherein the fourth pair is a pair of a fourth source among the transmission sources and a fourth destination among the transmission destinations, in which the first queue length of the input queue information is greater than or equal to the first threshold value, and the value of a correlation is less than or equal to the second threshold value.

11. The non-transitory computer-readable medium according to claim 9, wherein the process is further includes executing a ninth process that includes mirroring of communication, on at least one of the first pair and the second pair, the one of the first pair and the second pair being identified as a mirroring target.

12. The non-transitory computer-readable medium according to claim 9, wherein the process is further includes executing a tenth process that includes obtaining a correlation coefficient between a temporal transition of the first queue length and a temporal transition of the second queue length of the output queue information, wherein the first queue length being the latest value included in the temporal sequence of the input queue information is greater than or equal to the first threshold value.

\* \* \* \* \*